Oct. 4, 1966 R. A. SPAULDING ET AL 3,276,978
HIGH SPEED PLATING METHOD AND APPARATUS
Filed July 25, 1962 14 Sheets-Sheet 1

INVENTORS
Robert A. Spaulding,
Dano J. Agresta,
Richard F. Dolan,
Clarence G. Chambers,
BY Bernard A. Matrille,
& Richard L. Tew
A. F. Brillio
ATTORNEY

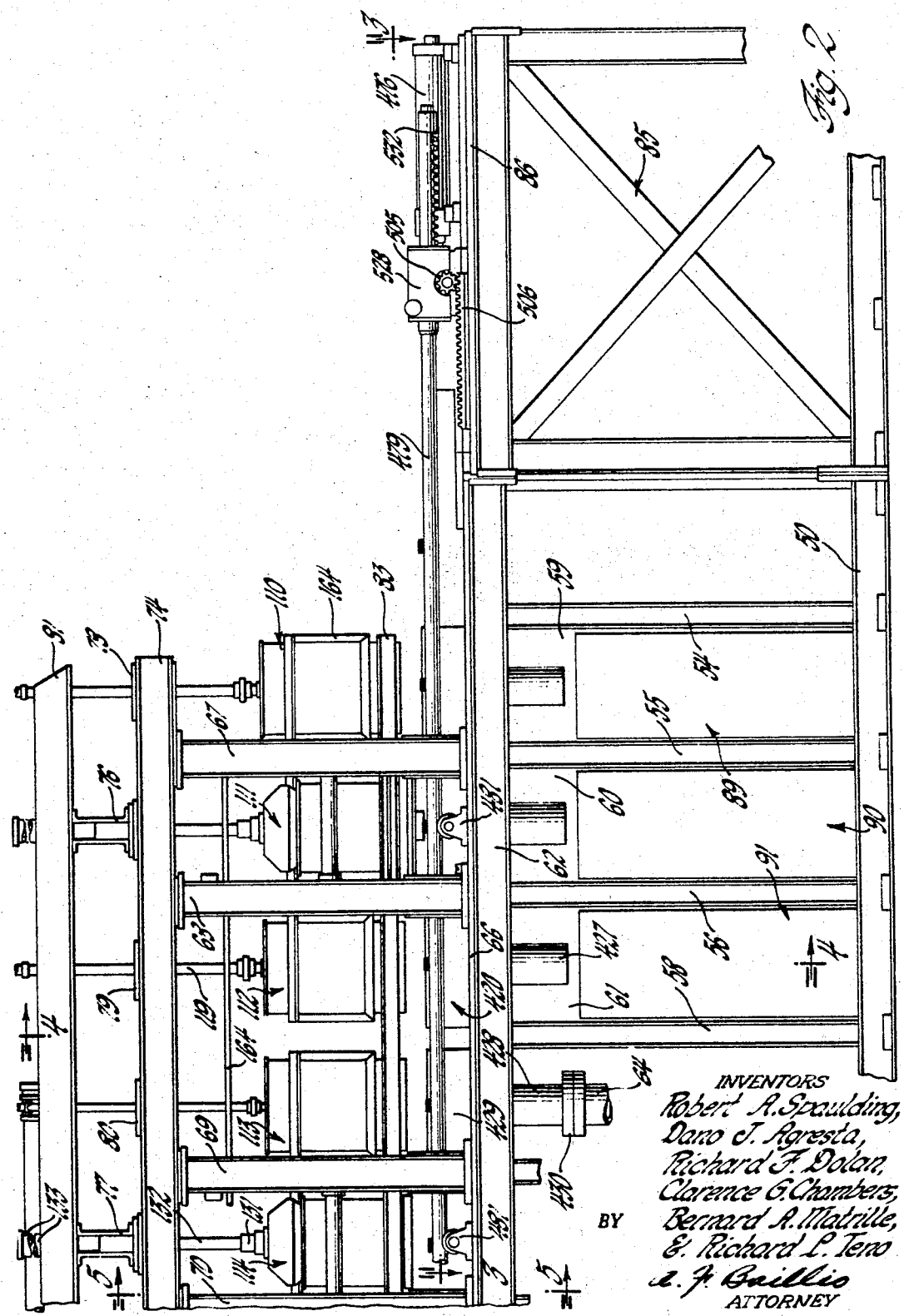

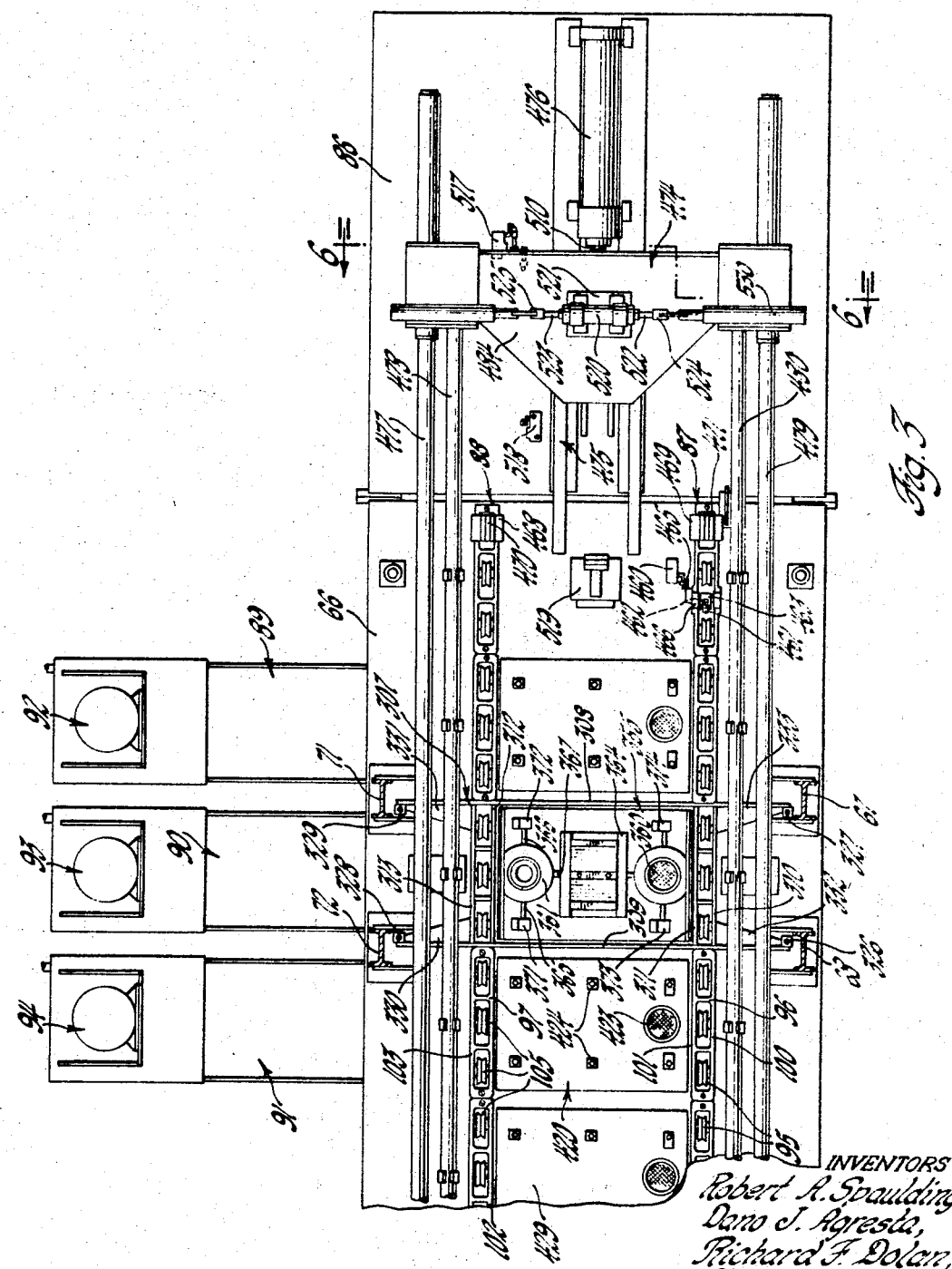

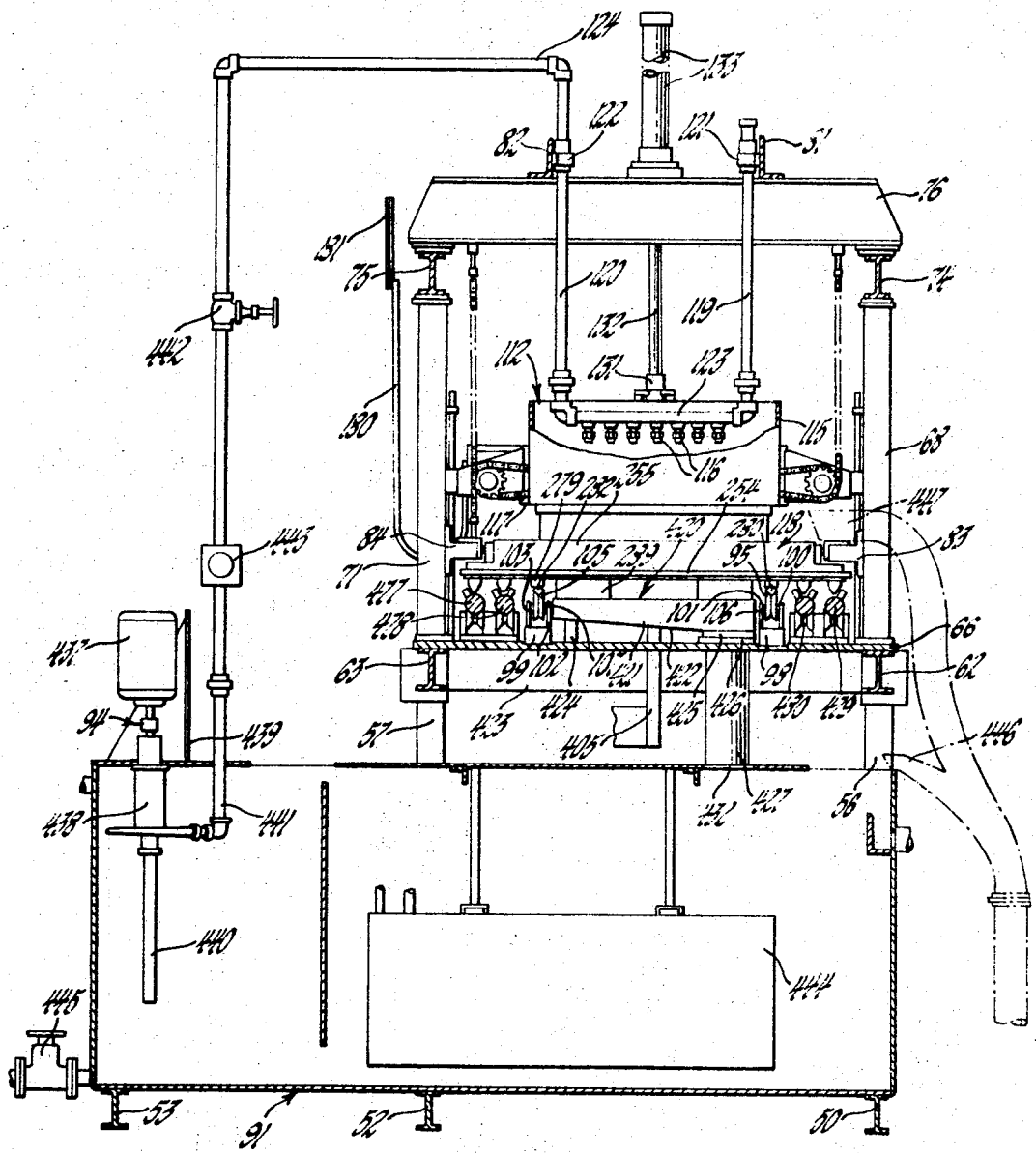

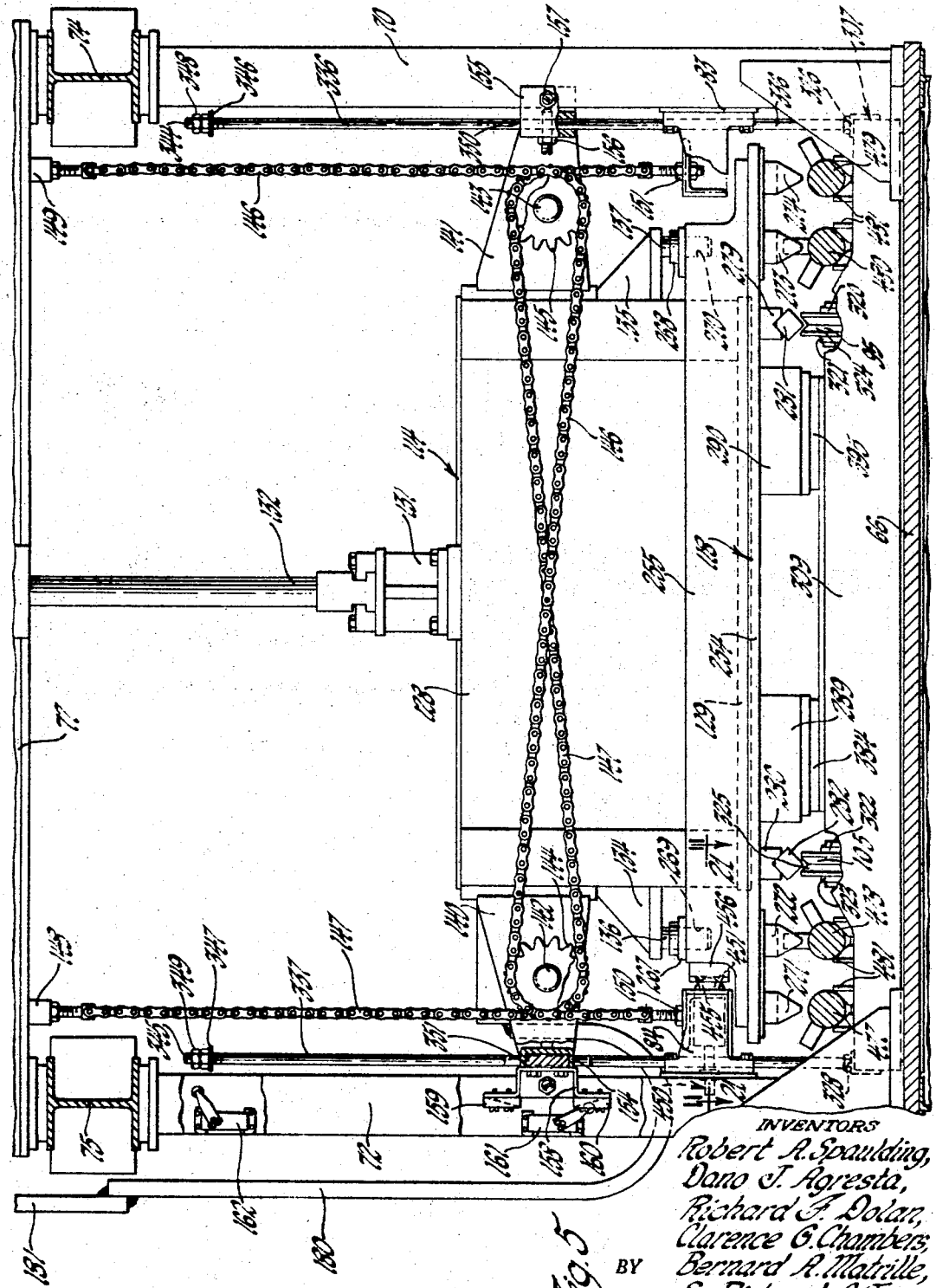

INVENTORS
Robert A. Spaulding,
Dano J. Agresta,
Richard F. Dolan,
Clarence G. Chambers,
BY Bernard A. Matrille,
& Richard L. Teno
a. F. Baillie
ATTORNEY Oct. 4, 1966
R. A. SPAULDING ET AL
3,276,978
HIGH SPEED PLATING METHOD AND APPARATUS
Filed July 25, 1962
14 Sheets-Sheet 7
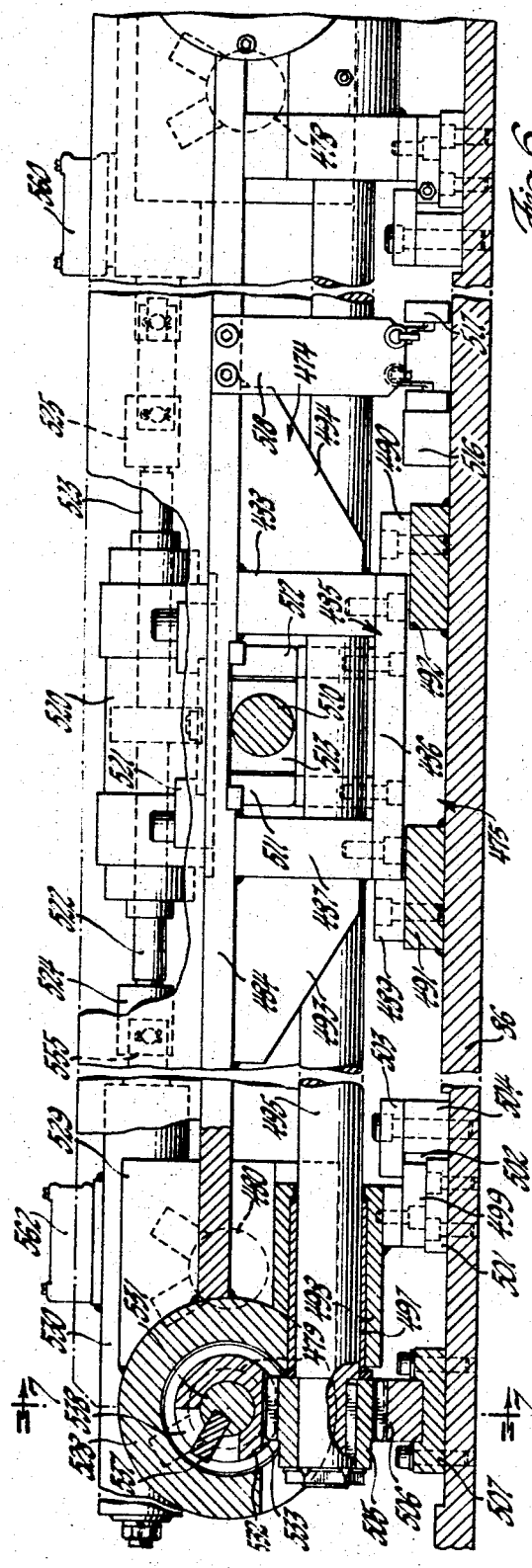
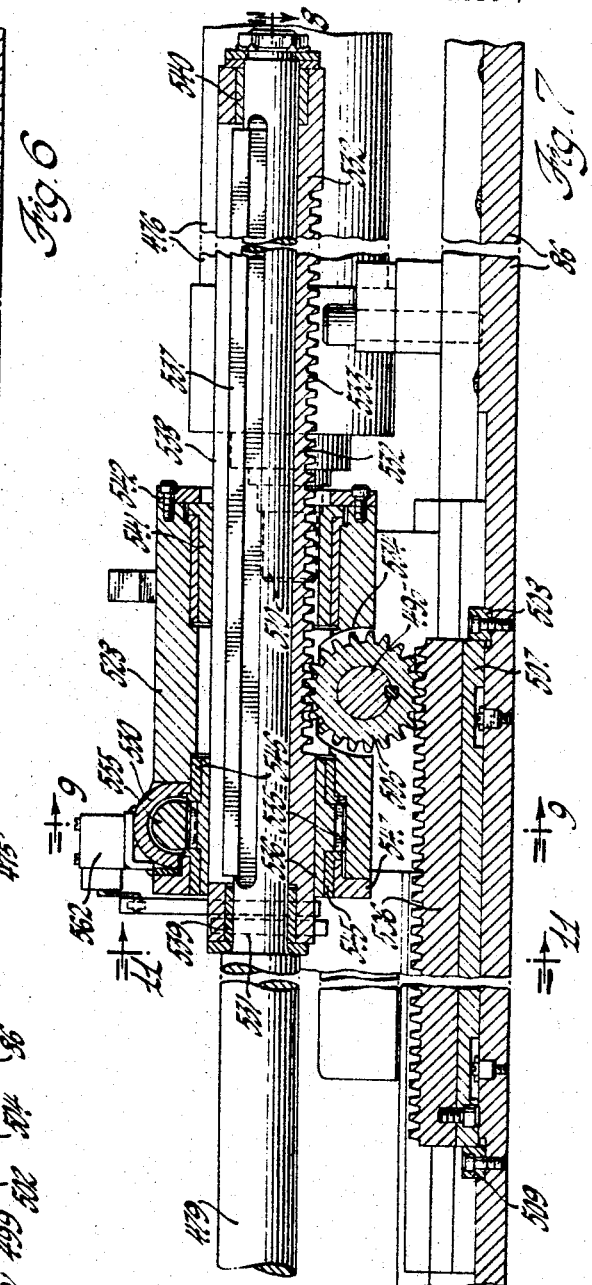
INVENTORS
Robert A. Spaulding,
Dano J. Agresta,
Richard F. Dolan,
Clarence G. Chambers,
BY Bernard A. Matrille,
& Richard L. Teno
A. F. Baillio
ATTORNEY Oct. 4, 1966    R. A. SPAULDING ET AL    3,276,978
HIGH SPEED PLATING METHOD AND APPARATUS
Filed July 25, 1962    14 Sheets-Sheet 9

INVENTORS
Robert A. Spaulding,
Dano J. Agresta,
Richard F. Dolan,
Clarence G. Chambers
BY Bernard A. Matrille,
& Richard L. Tero
A. J. Baillie
ATTORNEY

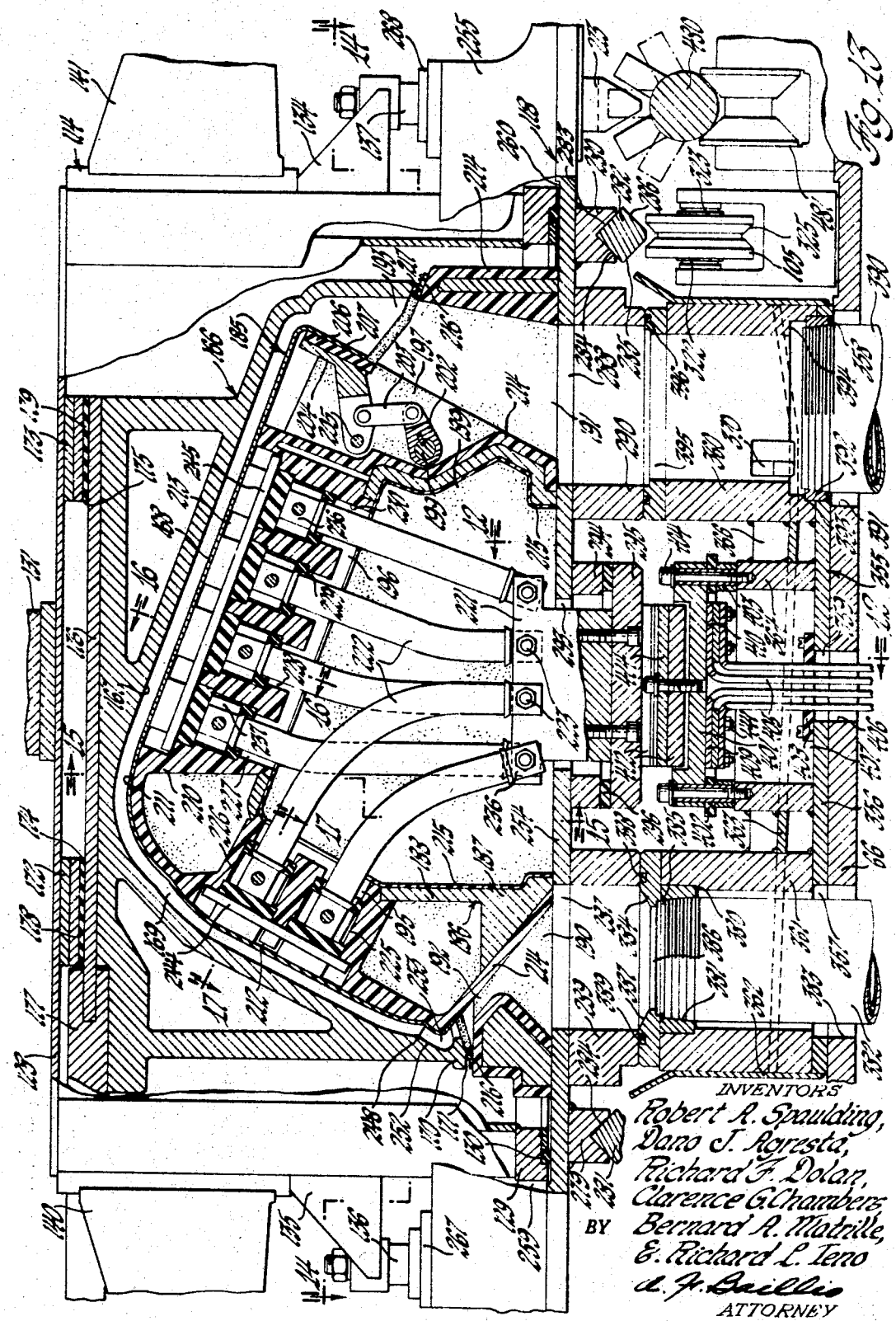

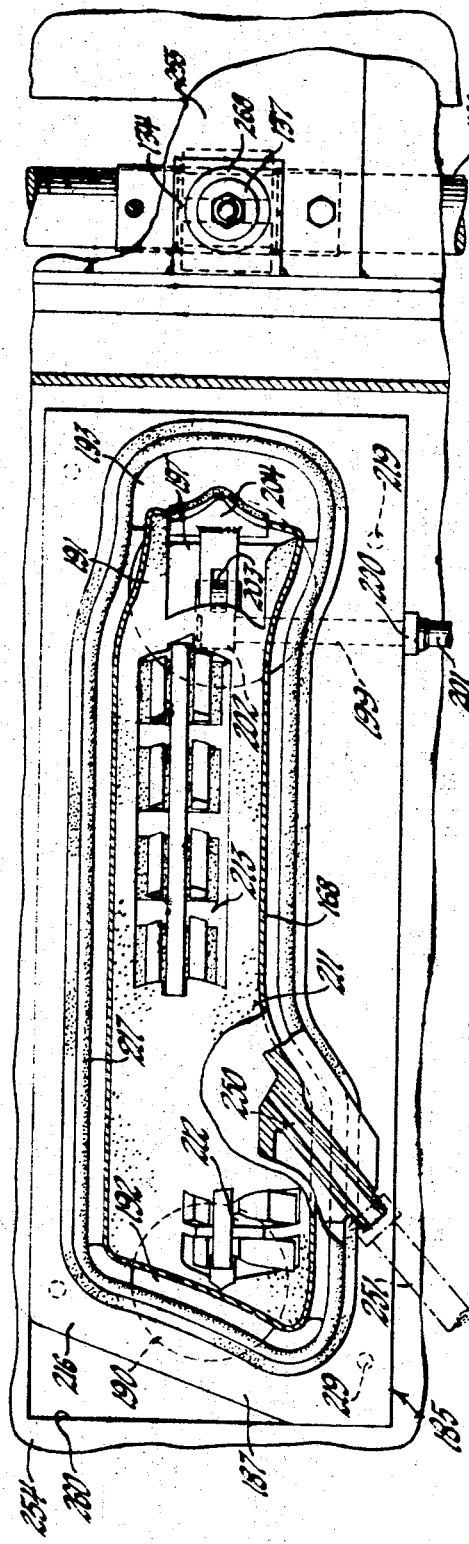

Oct. 4, 1966  R. A. SPAULDING ET AL  3,276,978
HIGH SPEED PLATING METHOD AND APPARATUS
Filed July 25, 1962  14 Sheets-Sheet 13

INVENTORS
Robert A. Spaulding,
Dano J. Agresta,
Richard F. Dolan,
Clarence G. Chambers,
BY Bernard A. Natale,
& Richard L. Teno
A. J. Baillio
ATTORNEY Oct. 4, 1966  R. A. SPAULDING ET AL  3,276,978
HIGH SPEED PLATING METHOD AND APPARATUS
Filed July 25, 1962  14 Sheets-Sheet 14

INVENTORS
Robert R. Spaulding,
Dano J. Agresta,
Richard F. Dolan,
Clarence G. Chambers,
BY Bernard R. Matrille,
& Richard L. Teno
A. J. Baillie
ATTORNEY

3,276,978
HIGH SPEED PLATING METHOD AND APPARATUS
Robert A. Spaulding, Huntington Woods, Dano J. Agresta, Warren, Richard F. Dolan, Mount Clemens, Clarence G. Chambers, Birmingham, Bernard A. Matrille, Utica, and Richard L. Teno, East Detroit, all of Michigan, assignors to General Motors Corporation, Detroit, Mich., a corporation of Delaware
Filed July 25, 1962, Ser. No. 212,318
11 Claims. (Cl. 204—45)

This invention relates to a plating method and apparatus, and more particularly to an electrolytic plating method and apparatus in which workpieces are automatically transported to successive work stations to have various plating operations performed thereon. The invention is particularly directed to a new concept of high quality plating of individual parts on an assembly line basis in a manner providing greatly increased rates of production at substantial reductions in cost.

Automatic electroplating machines commonly have a plurality of preparation tanks containing solutions in which articles to be plated are immersed for cleaning, rinsing, etching and similar treatments. In addition, plating tanks and finishing tanks for reclaim operations or the like are provided. In conventional construction, such machines are provided with workpiece carriers adapted to carry multiple workpieces and to be advanced from tank to tank in a series of steps by suitable conveyor mechanism. Elevator mechanism operating in timed relation with the conveyor mechanism is also provided to raise and lower the carriers within each individual tank. The workpiece carriers generally comprise rack-type structure on which a plurality of individual workpieces are supported. Often, as many as ten or more parts are supported on a single carrier. Thus, racks supporting a plurality of individual articles are moved from tank to tank by the conveyor mechanism and raised and lowered at each tank by the elevator mechanism to immerse the articles in the tanks. It is conventional practice to space the tanks so that a plurality of workpiece carriers can be advanced from one tank to the next on successive movements of a step by step type conveyor. The plating operation is conventionally carried on in large tanks adapted to simultaneously contain a plurality of immersed workpiece carriers which may remain immersed during movement thereof by the conveyor from one end of a plating tank to the other.

The utilization of large tanks for immersing a plurality of workpiece carriers or even a plurality of workpieces on a single carrier has inherent disadvantages. In particular, a uniform plating thickness on a particular workpiece and between workpieces on a carrier is extremely difficult to obtain. One of the reasons that the thickness of the plating is not uniform is the difficulty of locating anodes equal distances from all of the parts immersed in the tank. When the workpieces are of intricate configuration the problem of uniform anode spacing is particularly acute. In addition, it is also difficult to obtain uniform and accurate plating thicknesses because of variations in process solution contact with particular workpieces. The lack of uniformity of solution contact is due to the fact that many parts are supported on a particular carrier with resultant variations in spacing of each part from the other parts, the racks, the anode and the sides of the tank. Most articles having intricate shapes or even simple curves cannot be plated properly during movement through a plating tank because the anodes must be positioned to permit movement of the articles through the tank. Consequently, all portions of the articles have a different spacing from the anodes. As previously discussed, the variation in spacing of the articles will be sufficient to produce variations in plating thickness.

Automobile bumper bars are typical of articles which cannot be satisfactorily plated while being moved through a plating bath. Such articles are conventionally plated in machines which lower the articles into a tank where they are immersed for treatment. In such machines, the plating is carried on at a number of treatment positions in one or more tanks. At each position a group of anodes are placed within the tank so that a workpiece carrier may be lowered to immerse a plurality of workpieces in a plating solution in a particular spatial relationship with the anodes to better control the positioning of the workpieces relative thereto. However, in order to maintain high production volumes during the plating operation, many workpieces must be mounted on a particular workpiece carrier. Due to variations in the spacing between individual workpieces and the workpiece carrier, it is impossible to arrange the anodes so that they are equally spaced from all portions of a particular workpiece and from all portions of similar workpieces. Although the amount of variation in plating thickness may be reduced by the tank immersion method, a high proportion of parts are substandard because of considerable variations in plating thickness. In the tank immersion machine the workpiece carriers are delivered to and removed from the processing tanks by a conveyor and an elevator as previously described. In order to increase rate of production, each of the tanks must hold a multiplicity of parts. In tank immersion plating machines of this type, the overall lengths of the plating tanks are extreme. A substantial rate increase in plating with this type of machine concurrently involves incidental undesirable results. Hence, such increases are impractical.

The principal object of this invention is to provide a high production, in-line type, plating machine which is capable of plating parts, such as automobile bumpers, at high production rates and with increased uniformity of plating thickness on all portions of the parts, including parts having complex compound curvatures. It is a further object of this invention to provide a plating machine in which individual parts are plated in separate plating operations so that the inherent difficulties of mounting a plurality of parts on a conveyor rack are eliminated. Another object is to provide a plating method whereby the plating rate and plating conditions can be precisely controlled for a particular part and whereby the plating operation can be particularly developed for the need of a particular part rather than to meet requirements dictated by simultaneous plating of a plurality of parts in juxtaposition. A further object of this invention is to provide means for plating individual parts so that defective conditions occurring during a plating operation will affect only one part, namely the part being operated on at the time the defect causing condition occurs. Another object of this invention is the provision of a concept of high production plating which is entirely different from previous commercially feasible high production plating methods. A further object of this invention is to provide a workpiece plating carrier having an independent solution applying compartment for each workpiece. Still another object is to provide a workpiece carrier which may be placed in a solution applying position at a plurality of work stations without immersing the workpiece carrier in a solution tank. Another object is to provide an apparatus for electrodepositing metal unusually uniformly at high rates of speed on non-planar surfaces. Yet another purpose of the invention is to provide a method of treating parts to deposit decorative metal coatings of uniform thickness at high rates of speed. In conjunction with the provision of new plating apparatus and new methods of plating, a new method of high volume commercial plating has been developed.

In general, the aforementioned objects of this invention are accomplished by the use of a palletized plating fixture for individual parts, which is movable on conveyor means between a plurality of processing stations at which particular plating processes are performed within a plating cell formed thereat. The palletized plating fixture is designed to accommodate individual workpieces and to retain the individual workpieces in a predetermined position throughout the plating process. Individual workpieces are supported during each portion of plating operation within individual plating cells to which various plating solutions and plating preparation solutions may be alternately applied without removal of the workpiece from the particular palletized plating fixture within which it is originally received. The use of large tanks to immerse parts to be plated is entirely eliminated and mechanism required for elevating workpieces into and out of solution tanks is also entirely eliminated. The prior commercially available part conveying apparatus, requiring immersion of workpieces within particular tanks, is replaced so that the necessary operations are performed within individual plating cells at each of the work stations. In this manner, cleaning solutions and plating solutions are forced through the plating cell at the various stations without any repositioning of the workpiece relative to its initial position in the palletized plating fixture. A predetermined spatial relationship of a palletized plating fixture in processing position as shown at station 2 in FIGURE 2;

FIGURE 13 also has an enlarged cross-sectional view of a plating cell formed at station 2 in FIGURE 2;

FIGURE 14 contains a cross-sectional view of a portion of the apparatus shown in FIGURE 13 and taken along the line 14—14 in FIGURE 13;

FIGURE 15 illustrates a cross-sectional view of a portion of the apparatus shown in FIGURE 13 and taken along the line 15—15;

FIGURE 16 shows a cross-sectional view taken along the line 16—16 and showing a portion of the apparatus in FIGURE 13;

FIGURE 17 shows a cross-sectional view of a portion of the apparatus shown in FIGURE 13 and taken along the line 17—17;

Figure 18:
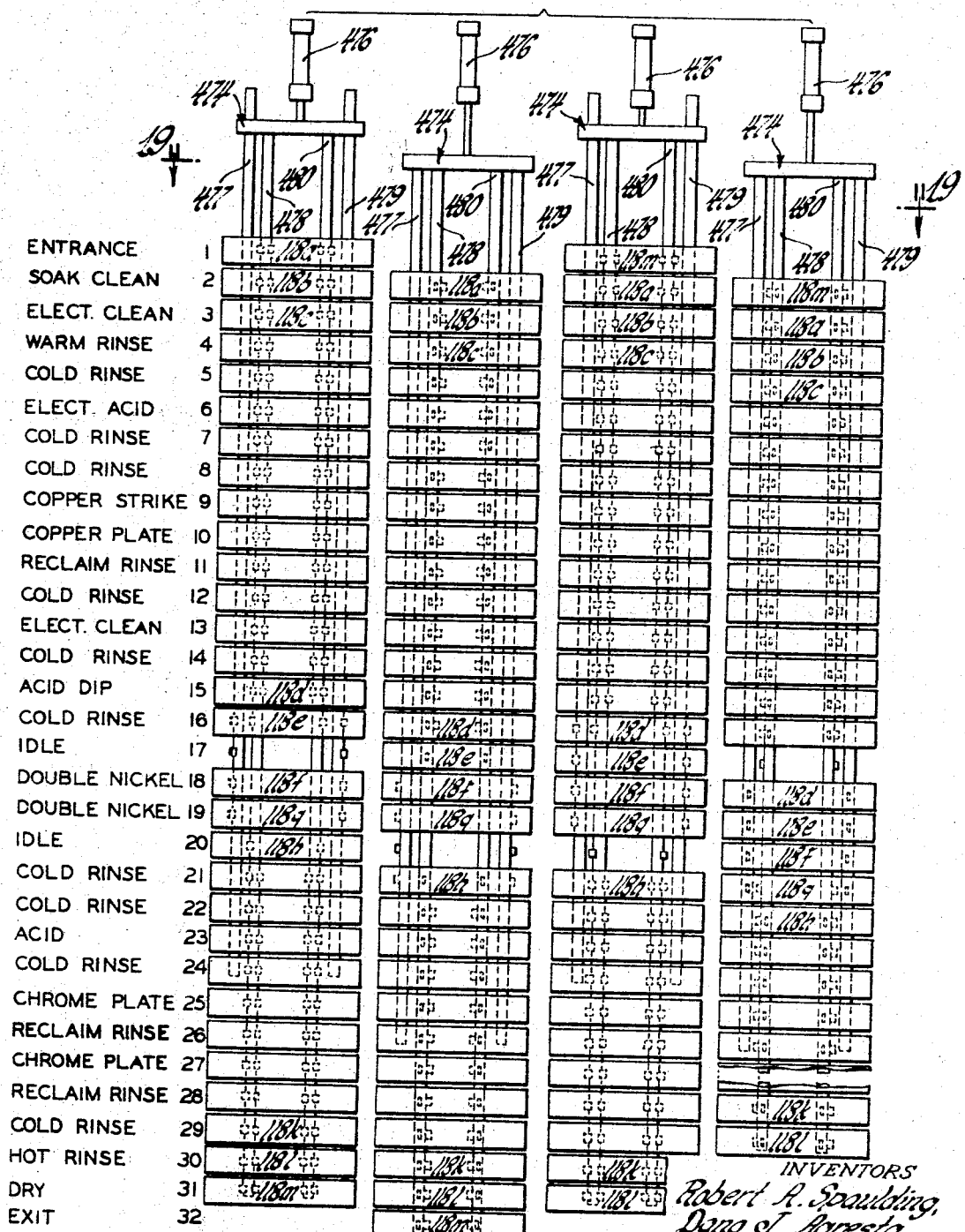
Figure 19:
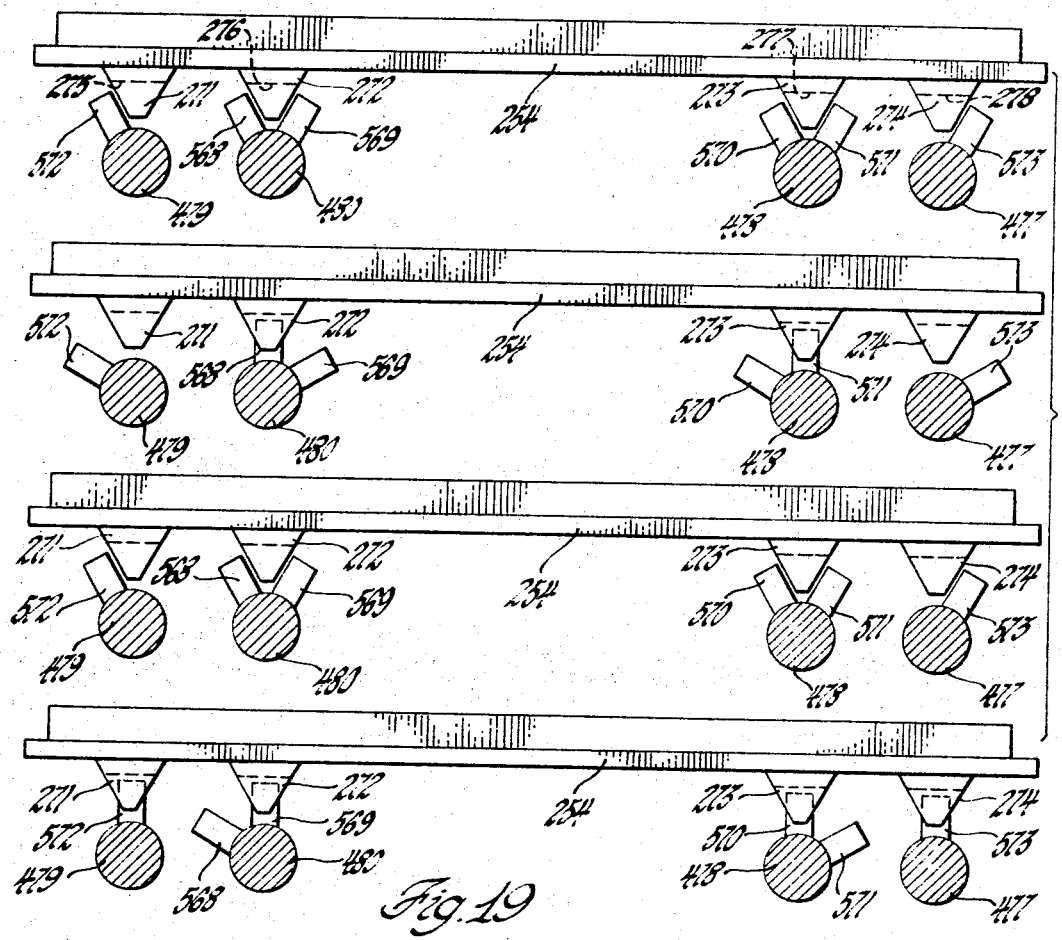
Figure 20:
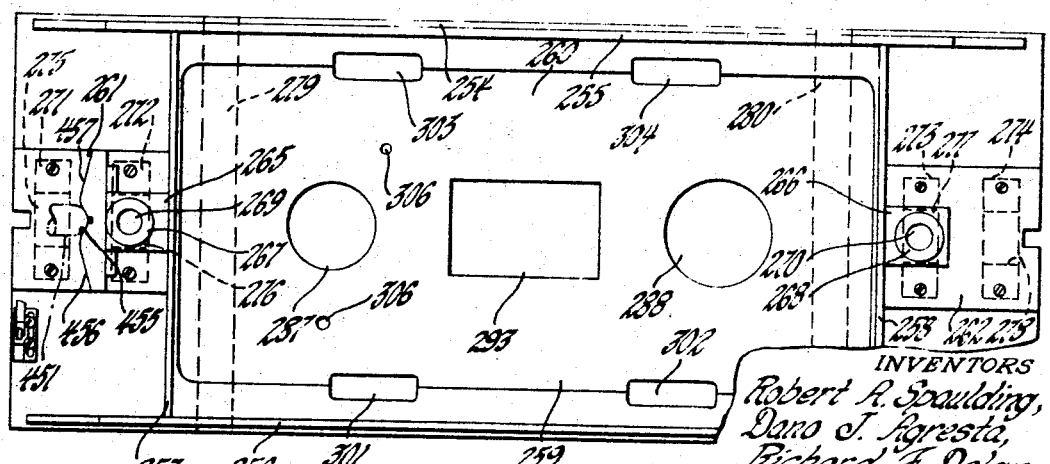
Figure 21:
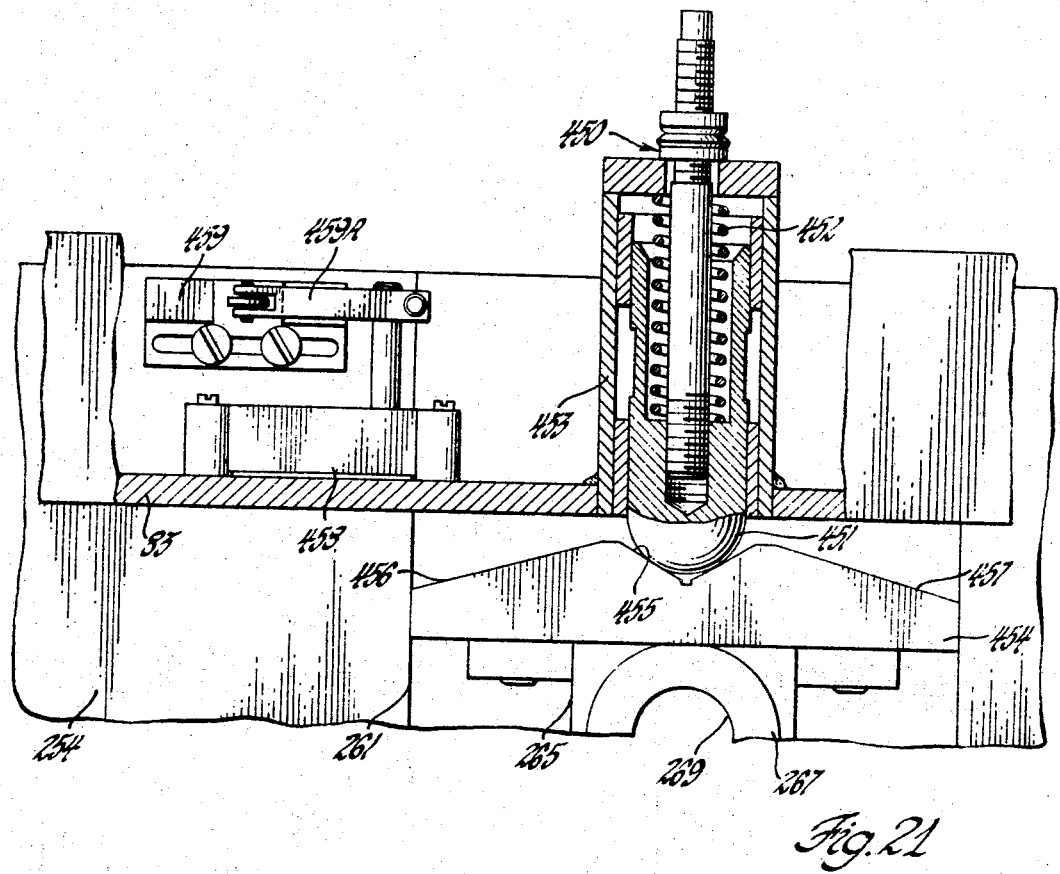
Figure 22:
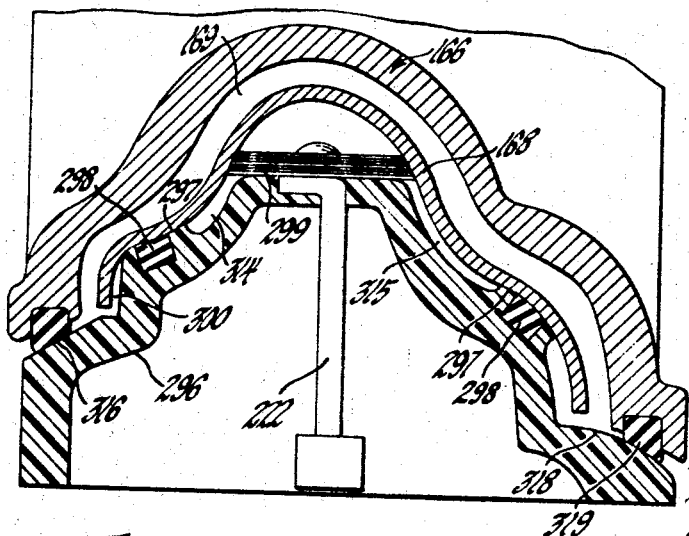

FIGURE 18 diagrammatically illustrates the method of transferring palletized plating cells from station to station;

FIGURE 19 diagrammatically illustrates the method of transferring palletized plating cells from station to station;

FIGURE 20 contains a plan view of a pallet for a plating cell;

FIGURE 21 illustrates an enlarged sectional view of a portion of the apparatus shown in FIGURE 5 and taken along the line 21—21; and FIGURE 22 shows a cross-sectional view of an alternative embodiment of the cathode fixture shown in FIGURE 13.

In general, the present invention comprises the provision of a plating machine having a plurality of aligned thereafter carries the palletized plating cell from the loading station to the first station of the machine whereat the palletized plating fixtures are fed onto a pallet conveyor mechanism which is actuable to move the palletized plating fixtures step by step from station to station. In some cases, the normal step by step movement of the palletized plating fixtures between successive stations is changed so that a station may be skipped or the formation of a cell at a particular station may be maintained for longer than a standard or normal processing period between transfer movement. In this manner, stations which require a longer processing time, compared to the other stations, may be accommodated without disrupting a standard stop period between transfer movement. The particular process solutions at each station are pumped or otherwise delivered under pressure within the processing cell formed thereat to contact the workpiece carried by the palletized plating fixture in a predetermined manner and to accomplish a predetermined result during the standard stop time. At each work station, a particular process solution is applied to the part within the plating cell and subsequently removed from the plating cell before the palletized plating fixture is transferred to the next work station. A plurality of tanks are provided adjacent each work station and suitable pumping means may be provided to convey the fluid from the tanks to the plating cells. In addition, at some stations, a processing material such as rinse water is applied from a central source through retractable shroud housing type fixtures provided at such working stations to form a processing cell with the palletized plating fixture. Suitable tanks are provided below the processing cell to collect rinse water or the like delivered through the retractable heads. The processing cycle is arranged so that suitable rinsing stations separate processing stations in which activated processing solutions are used. In this manner, the palletized plating fixtures are completely washed and cleaned between applications of plating solutions so that a solution applied at a particular station is completely washed or rinsed away before the palletized plating fixture arrives at another plating or similar process station. The operation of the machine is continuous and the different process solutions are applied to the individual parts supported within the processing cells in a manner in which the application of plating solution to the individual workpiece can be rigidly controlled and in which the position of an anode fixture relative to the surface of the workpiece to be plated is also rigidly controlled and maintained. The capacity of the machine is limited only by the time each individual workpiece must remain at a particular processing station. In order to increase the plating rate of the machine as a whole, special methods of applying the plating solutions are provided which increase the plating rate substantially relative to previously known methods of plating similar parts on a mass production basis. In this manner, although individual workpieces are plated as compared to plating of a multiplicity of workpieces at a particular station as known in the prior art, the plating rate capable of being achieved with the machine and methods provided by this invention is greatly increased over the plating rate which could be achieved in previous apparatus. In addition, plating quality is also increased. The control of the plating cycle is facilitated by providing work stations that are equally spaced from one another and by providing equal stop intervals for the palletized plating cells at each of the work stations. In general, each of the palletized plating fixtures is moved an equal distance between each station and remains at each station an equal time. Any necessary deviations from the standard stop time are accommodated by the special transfer mechanism provided which permits an increased process time at particular process stations, such as a plating station, without disrupting the continuous over-all operation of the machine.

THE PROCESS

Figure 1:
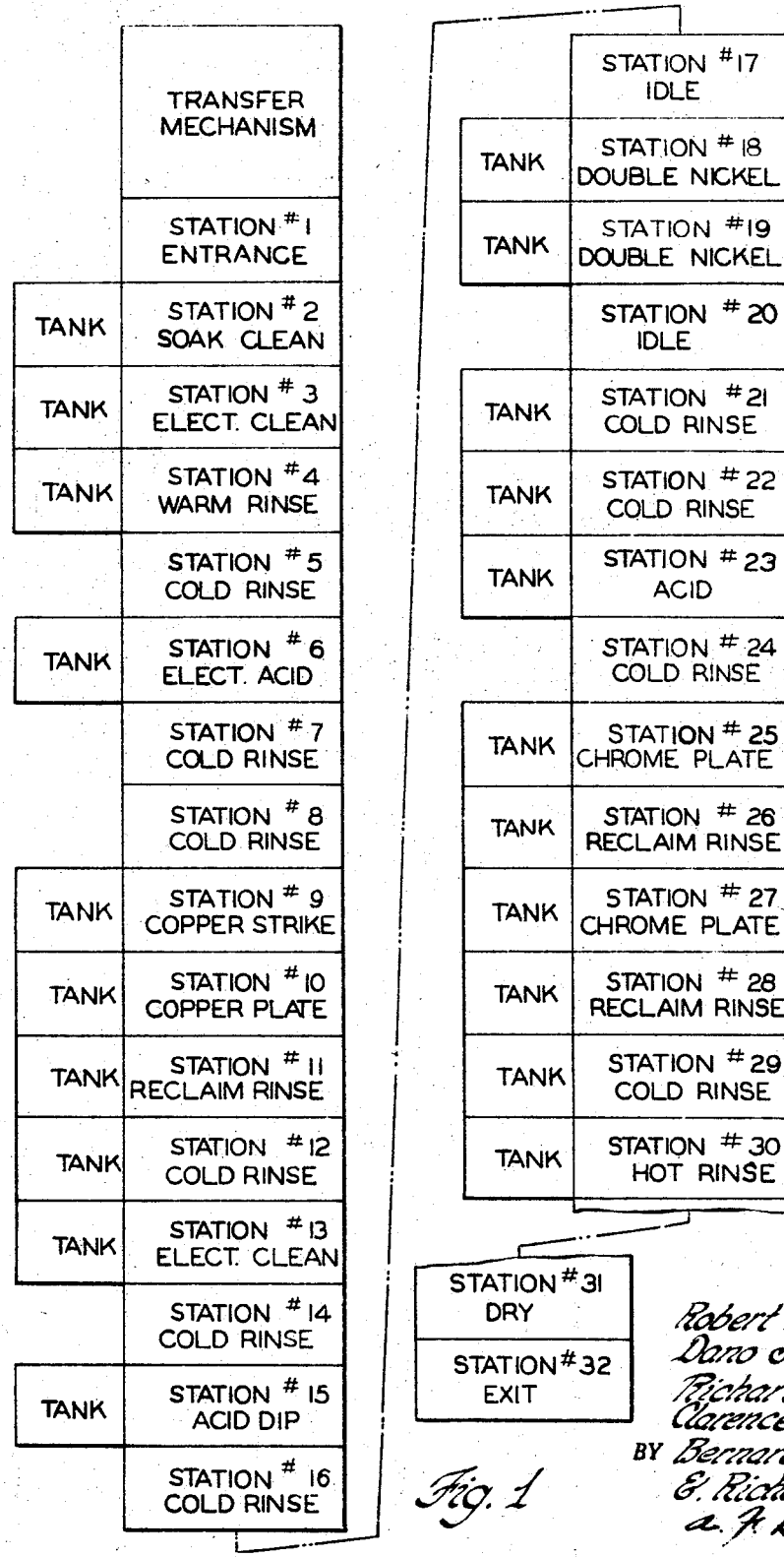

The plating process hereinafter described relates to general process requirements since many of the component processes of the complete plating system are variable and dependent on the particular part being processed and the particular result desired. However, it is to be noted that unusually high current densities can be used to obtain a satisfactory decorative electro-deposit having an extremely uniform thickness in a very short period of time. For purposes of illustration, a standard 30 second dwell, or stop, time is specified for the palletized plating fixture at each station and a standard transfer time of 8 seconds between stations is utilized. It is to be noted that the operation of the machine is very flexible and other time intervals may be used as desired. The processing sequence for a single workpiece on a single palletized plating fixture is shown in FIGURE 1.

The preferred plating process is embodied in a machine comprising thirty-two separate in-line stations and transfer mechanism to successively move individual palletized plating fixtures from station to station. As shown in FIGURE 1, several of the stations are provided with individual solution tanks from which various process solutions are applied to processing cells formed by association of cover heads at each station with the palletized plating fixtures. The process sequence for a particular part comprises the preliminary steps of loading the part or workpiece on a cathode mounting fixture which is associated with a pallet to form a palletized plating fixture, and moving the palletized plating fixture to machine entrance station No. 1 whereat the palletized plating fixture is associated with transfer mechanism which controls movement of the palletized plating fixtures from station to station through the machine. As previously discussed, an individual palletized plating fixture will be located at each processing station during normal full scale production runs. The transfer mechanism moves each individual palletized plating fixture simultaneously from station to station and a standard stop time is utilized for forming a processing cell and applying processing solution at each station. After a palletized plating cell has been loaded with a part and positioned at entrance station No. 1 during a standard stop time, the next movement of the transfer mechanism carries the loaded palletized plating cell from station 1 to cleaning station 2. When the palletized plating cell is in position at station No. 2, a shroud housing in positioned around the workpiece and a cleansing solution is pumped from an adjacent tank to spray apparatus in the shroud housing from which the cleansing solution is sprayed over the workpiece. The cleansing solution flows over the workpiece and returns to the tank through a drain opening extending through the palletized plating fixture and a collection sink provided thereunder. The application of the cleansing solution is completed within the standard stop time and the shroud housing is disassociated from the palletized plating fixture before the next movement of the transfer mechanism which carries the palletized plating fixture from station No. 2 to electrical cleaning station No. 3. The apparatus provided at station No. 2 and the operation thereof is similar to the apparatus provided at stations No. 4, 5, 7, 8, 11, 12, 14, 15, 16, 21, 22, 23, 24, 26, 28, 29, 30 and 31. Therefore, only the process variations are hereinafter described in detail.

After the palletized plating fixture is properly positioned at station No. 3, an anode housing is positioned in sealing engagement therewith to form a processing cell and the palletized plating fixture is simultaneously positioned in sealed engagement with a solution applying passage and a solution receiving sink. At the same time, an electrical connection is obtained between the cathode mounting fixture and an electrical source provided at station No. 3. The anode fixture may be permanently electrically connected since it is permanently located at station No. 3. Cleansing solution is then pumped at a high rate of flow from an adjacent tank through the solution applying passage and into a flow cavity formed between a contoured lower surface of an anode fixture within the anode housing and a parallel closely spaced surface of the workpiece on the palletized plating fixture. The flow cavity encompasses the entire surface to be plated of the workpiece and the cleansing solution flows completely over the outer surface of the workpiece. The anode fixture is electrically energized and the workpiece is electrically energized through contact with the cathode mounting fixture during the cleansing process. The cleansing solution flows through an outlet port extending between the palletized plating fixture and the solution receiving sink to the adjacent tank. At the end of the solution applying cycle and before the elapse of the standard stop time, the pumping of cleansing solution is discontinued and the palletized plating fixture is disengaged from the solution applying passage, the solution receiving sink, the electrical source and the anode housing to prepare the palletized plating fixture for transfer to the next station when the standard stop time has elapsed. It is to be understood that the shroud housings and anode housings at the various stations are simultaneously raised and lowered during the standard stop time and therefore no further reference to the positioning of the housings need be made in this brief description of the processing steps. The apparatus provided at station No. 3 and the operation thereof is similar to the apparatus provided at the subsequent electrical processing stations No. 6, 9, 10, 13, 18, 19, 25 and 27 whereat anode housings are provided. Accordingly, only the process variations are hereinafter described in detail.

The next movement of the transfer mechanism carries the palletized plating fixture from station No. 3 to warm rinsing station No. 4. After a shroud housing is associated with the palletized plating fixture, warm rinsing solution is pumped from an adjacent tank containing a heating element and applied to the workpiece. Before the stop time elapses, the solution application is discontinued and the shroud housing is disassociated from the plating fixture. The next movement of the transfer mechanism carries the palletized plating fixture from station No. 4 to cold rinsing station No. 5. Station No. 5 is identical to station No. 4 except that the solution is maintained at a lower temperature. The cold rinse solution may be supplied directly from a central water source and drained to a sewer connection rather than being pumped from and collected in an adjacent tank as at station No. 2. The processing at stations 7, 8, 12, 16, 21, 22, 24 and 29 is similar.

At station No. 6, an anode housing is associated with the palletized plating fixture and an acid solution of suitable composition is applied to the workpiece at a suitable rate of flow and current density.

The palletized plating fixture then passes through successive cold rinse stations No. 7 and 8 which are provided to insure a thorough removal of the cleansing acid applied to the palletized plating fixture at station No. 6 without disrupting the standard stop time. In other words, when a longer processing time is required than the standard stop time, a plurality of similar stations may be provided to enable the application of processing solution for the required processing time without unnecessarily increasing the stop time at other processing stations which require a lesser processing time.

Station No. 9 is a copper strike station whereat a processing solution of suitable composition is applied at a suitable flow rate and current density.

Station 10 is a copper plate station whereat the workpiece is copper plated by the application of a processing solution of suitable composition at a suitable flow rate and current density.

Station 11 is a reclaim rinse station whereat copper is reclaimed from the rinse solution.

After a cold rinse at station No. 14, the palletized plating fixture is moved to acid dip station No. 15 whereat an acid solution of suitable composition is sprayed over the workpiece to additionally clean the copper plated workpiece.

After a cold rinse at station No. 16 to remove acid, the palletized plating cell is moved to either station No. 17 or No. 18 depending on whether station No. 17 is empty. Thus, by the provision of another idle station No. 20, the palletized plating cells can remain at stations No. 18 and 19 for two standard stop periods and each palletized plating cell stops only at one or the other of stations 18 and 19. At nickel plating stations No. 18 and 19, a nickel plating solution of suitable composition is applied to the workpieces at a suitable flow rate and current density for a suitable period of time.

The palletized plating fixture is next moved to cold rinse station No. 21 from station No. 19 or from idle station No. 20 depending on the machine cycle. A second cold rinse station No. 22 insures complete rinsing of the nickel plating solution.

An acid solution of suitable composition is applied to the nickel plated workpiece at station No. 23 to prepare the nickel surface for a chrome plating operation. The acid is washed away at station No. 24.

The chrome plate is applied at stations No. 25 and No. 27 at suitable flow rates and current densities. Some of the chrome plating solution is reclaimed at rinse stations No. 26 and 28.

The chrome plated workpiece is then washed and rinsed at rinse stations No. 29 and 30, and dried at station No. 31 prior to association of the palletized plating fixture with overhead conveyor means or the like at exit station No. 32 for movement of the palletized plating fixture to an unloading station and thereafter to the loading station and back to station No. 1 as previously described.

In summation and by way of further detail, the process shown in FIGURE 1 has been practiced on the left corner bar, or wing, of the 1961 Chevrolet front bumper. The conforming anode used in treating this part is spaced approximately one-half inch from the surface of the wing to form a rather extended treatment chamber therebetween. As previously indicated, the solution used to treat the part is passed in one end of the chamber and out the other. The velocity of the solution flowing through the chamber in this manner is equal to about 7.1 feet per second for each 100 gallons being pumped through per minute (g.p.m.). Hence, for a rate of flow of 200 g.p.m. the solution velocity in the chamber is about 14.2 feet per second, for 400 g.p.m. the solution velocity is about 28.4 feet per second, for 600 g.p.m. the solution velocity in the chamber is about 42.6 feet per second, etc. Thus, the process shown in FIGURE 1, also involves:

*Station 1*

An automatic loading station whereat the palletized plating fixture is automatically loaded on the machine transfer mechanism.

*Station 2*

A spray cleaning station whereat foreign matter, such as oil, dirt, buffing compound, etc., on the surface of the part to be plated is removed. The cleaning solution applied will usually be an alkaline type of cleaner of conventional composition comprising alkali, such as caustic soda, phosphate, carbonate, etc., emulsifiers, wetting agents and other soil removing aids. The stop interval is 30 seconds and the cleaning solution is pumped to the part at a rate of approximately 200 g.p.m. at a temperature of approximately between 100° F. and 200° F.

*Station 3*

An electrolytic cleaning station whereat electrolysis is used to aid in removing foreign matter on the part which was not removed at station 2. The part is electrified and an alkaline type cleaning solution is pumped to the part at approximately 300 g.p.m. and at a temperature of between approximately 100° F. and 200° F. The stop interval is 30 seconds.

*Station 4*

A warm water rinse station whereat residual alkali film remaining on the part is removed by spraying water over the part at a rate of approximately 100 gallons per minute at a temperature of approximately 100° F. to 200° F. The stop interval is 30 seconds.

*Station 5*

A cold water rise station whereat additional residual alkalies are removed from the part by spraying tap water at line pressure over the part. The stop interval is 30 seconds.

*Station 6*

An electrolytic acid station which may be optionally used as an acid dip to neutralize any residual alkaline film or as an electrolytic acid for electrolytic polishing of the part. Sulfuric acid or other suitable acid solution, which may vary from less than 1% to more than 50% concentration, is used in our preferred process. It is pumped to the part at an approximate rate of 300 gallons per minute and an approximate temperature of 75° F. to 200° F. A current density, anodic or cathodic, of about 10 a.s.f. can be concurrently imposed on the part. This station can also be used for electropolishing, if desired. The stop interval is 30 seconds.

*Stations 7 and 8*

Cold rinse stations whereat any residual acid solution is removed by tap water at line pressure. The stop interval is 30 seconds at each station.

*Station 9*

A copper strike station whereat a "flash" of copper is deposited on the part to provide a base for subsequent operations that will promote adhesion. A conventional cyanide copper solution is pumped to the part at an approximate rate of 600 g.p.m. and at an approximate temperature of between 100° F. and 200° F. The part is electrified. The stop interval is 30 seconds.

*Station 10*

A copper plate station whereat sufficient copper is deposited to provide a suitable surface for subsequent bright nickel plating. The part is energized and may be cathodic or periodic reverse plating may be used. The solution is pumped to the part at an approximate rate of 600 gallons per minute and at a temperature of approximately 120° F. to 190° F. The stop interval is 30 seconds.

*Station 11 and 12*

Cold water rinse stations whereat any cyanide alkaline film residue on the part is removed by tap water pumped at an approximate rate of 100 gallons per minute. The stop interval is 30 seconds at each station.

*Station 13*

An electrolytic cleaning station which provides a supplementary cleaning to insure a clean surface prior to nickel plating. The part is electrified and an alkaline type cleaning solution is pumped to the part at a rate of approximately 300 gallons per minute and at a temperature of approximately 150° F. to 200° F. The stop interval is 30 seconds.

*Station 14*

A cold water rinse station identical to station 5.

*Station 15*

An acid cleaning station whereat any alkaline film residue remaining from station 13 is removed. An acid solution of sulfuric acid, hydrochloric acid, or any other suitable acid, is pumped to the part at an approximate rate of 100 gallons per minute and at approximately room temperature to 200° F. The stop interval is 30 seconds.

*Station 16*

A cold water rinse station identical to station 7.

*Station 17*

An idle station whereat the part may be located for a stop interval of 30 seconds without any processing to accommodate a stop interval of 60 seconds at stations 18 and 19.

*Stations 18 and 19*

Nickel plating stations whereat a nickel plating solution is pumped over the part at an approximate rate of 600 gallons per minute and at an approximate temperature of 100° F. to 200° F. The part is cathodically energized. The stop interval is 30 seconds or 60 seconds depending on whether a coating of one or two types of nickel is to be applied. In the latter instance, a solution for depositing semi-bright nickel is used at station 18 and a solution for depositing bright nickel is used at station 19.

*Station 20*

An idle station to accommodate stop intervals of 60 seconds at stations 18 and 19.

*Stations 21 and 22*

Cold water rinse stations whereat residual nickel plating solution on the part is removed by tap water sprayed thereon at an approximate rate of 100 gallons per minute. The stop interval is 30 seconds.

*Station 23*

An acid dip station, whereat the nickel surface on the part is activated prior to chromium plating by application of an acid solution, such as sulphuric acid, and other conventional additives which form an activated nickel surface. The acid solution is sprayed over the part at an approximate rate of 100 gallons per minute at room temperature. The stop interval is 30 seconds.

*Station 24*

A cold water rinse station, whereat residual acid solution is removed. The station is identical to station 5.

*Station 25*

A chromium plating station, whereat the chromium plating solution is pumped over the part at approximately 400 gallons per minute and at an approximate temperature of 100° F. to 200° F. The part is cathodically energized. The stop interval is 30 seconds.

*Station 26*

A reclaim rinse station, whereat residual chromium plating solution adhering to the part is removed by room temperature rinse water that is reclaimed. The stop interval is 30 seconds.

*Station 27*

A chromium plating station identical to station 25.

*Stations 28 and 29*

Cold water rinse stations whereat residual chromium plating solution is removed. The stations are identical to station 11.

*Station 30*

A hot water rinse station whereat the rinse water is heated to an approximate temperature of 180° F. to facilitate subsequent drying of the part. The station is otherwise identical to stations 28 and 29.

*Station 31*

A part drying station whereat hot air is blown over the part. The stop interval is 30 seconds.

Station 32

An unloading station whereat the palletized plating fixture is removed from the transfer mechanism and connected to a conveyor for removal to a part unloading station. The stop interval is 30 seconds.

THE MACHINE

A new and improved plating machine has been provided to accomplish the aforementioned processing steps. The processing stations are located in-line along a longitudinal frame made from structural steel members. Since the machine apparatus is duplicated at many stations, only the first five stations are shown. Furthermore, the various stations are, in general, provided with one or two types of processing apparatus. One type of apparatus is provided at stations where the processing step requires no electrical energization of any of the parts and such stations may be referred to as non-electrical stations. The other type of apparatus is provided at stations where the processing step requires cathodic energization of the workpiece and the energization of an anode member. Such stations may be classified as electrical stations. Non-electrical stations include a shroud housing in which spray apparatus is mounted and electrical stations include an anode housing in which an anode fixture is mounted. The two types of stations are hereinafter referred to, respectively, as shroud stations and anode stations, and one of each type of station will be described in detail by reference to the details of the apparatus at shroud station No. 4 and the details of the apparatus at anode station No. 3, which are exemplary.

FRAME AND ASSOCIATED PARTS

Referring now to FIGURES 2, 3 and 4, stations 1, 2, 3, 4 and of the plating machine are shown in detail, and it is to be understood that the other stations are similarly constructed. The machine comprises a frame of structural steel construction having a lower tank section which supports process solution tanks, an intermediate section which supports conveyor apparatus and an upper section which supports plating cell forming housings. As shown in FIGURES 2 and 4, the frame comprising a base formed by spaced horizontally extending lower structural members 50, 52, 53. A plurality of lower vertical structural members 54, 55, 56, 57, 58 extend upwardly from the base and form two spaced longitudinal rows of similarly positioned members. The vertical structural members in each row are spaced to define tank accommodating compartments 59, 60, 61 for each of the processing stations. Intermediate horizontally extending structural members 62, 63 are secured to the upper ends of the vertical structural members of each row and support a conveyor platform plate 66 which extends the length of the machine. A row of upper vertically extending structural members 67, 68, 69, 70 extends longitudinally along one edge of the conveyor platform 66 and another parallel row of identically located structural members 71, 72 extend longitudinally along the opposite edge of the conveyor platform 66. It is to be understood that similar upper vertical members extend the length of the machine. Upper horizontally extending support members 74, 75 are supported on the tops of the upper vertical structural members. Cross support structural members 76, 77 and cross support plates 78, 79, 80 extend transversely between the longitudinally extending structural members 74, 75. In addition, bracket plate members 81, 82 are secured to the top of the cross supports 76, 77 and extend longitudinally of the frame. As shown in FIGURES 4 and 5, bracket support plates 83, 84 may be secured to the inner side surfaces of the upper vertical members and extend longitudinally of the frame. A transfer mechanism support frame 85 is positioned adjacent one end of the machine frame and supports a transfer mechanism support platform 86 in substantial alignment with the conveyor platform 66.

Solutions tanks, such as tanks 89, 90, 91, illustrated at stations 2, 3 and 4, are provided at some of the stations and are seated in the tank compartments. Conventional pump mechanisms 92, 93, 94 are mounted adjacent each of the tanks as shown in FIGURE 3. At some of the stations, such as station No. 5, an outlet pipe 64 is provided in place of a tank to conduct processing solution to a central drain system. In addition, at the several plating stations, electrolyte regenerating tanks (not shown), are also provided adjacent the apparatus and are connected by suitable piping to the tanks provided beneath each station.

CONVEYOR MEANS

Referring now to FIGURE 3, a longitudinally extending conveyor track is centrally located on the support platform 66 and comprises spaced rows 87, 88 of horizontally aligned roller members 95, 105. The rollers at each non-electrical station may be mounted on individual support frames 96, 97 which are directly connected to the support platform 66. The rollers at each electrical station are specially mounted and will be hereinafter described in detail. The rollers 95, 105 and roller frame sections 96, 97 of adjacent work stations are parallelly aligned so that a continuous roller conveyor is provided for the palletized plating fixtures. For purposes of illustration, each section of rollers is shown to comprise three individual roller members. Referring now to FIGURE 4, the spaced sections of rollers at each of the non-electrical stations, such as station No. 4, comprise base plates 98, 99 which are secured to the support platform 66 in any suitable manner. Spaced side support plates 100, 101 and 102, 103, are secured to the base plates 98, 99 and extend upwardly therefrom. Suitable cross supports may be provided to divide each roller frame section into three roller compartments as shown in FIGURE 3. Support shafts 106, 107 are centrally located in each roller compartment and rotatably support the roller members 95, 105. As shown in detail in FIGURE 13, the roller members have a V-shaped peripheral cross section which is configured to receive mating portions of each palletized plating fixture during movement of the palletized plating fixtures from station to station.

Referring again to FIGURE 2, at each station where a processing solution is applied to a workpiece on a palletized plating fixture, solution controlling and confining housings 110, 111, 112, 113, 114 are vertically movably supported for movement between a retracted upper position during transfer of palletized plating fixtures from station to station and an extended lower position of sealing engagement with the palletized plating fixtures to form a processing cell during application of processing solution to the workpieces. Anode type housings 111, 114 are provided at electrical stations Nos. 3 and 6, and spray type housings 110, 112, 113 are provided at non-electrical stations Nos. 2, 4 and 5.

SPRAY HOUSING

Referring now to FIGURE 4, each of the spray housings comprises a rectangular casing 115 formed from sheet metal or the like and containing a plurality of spray nozzles 116. The lower portion of the casing is open and provided with a peripheral rim 117 which is adapted to be sealingly engaged with an upper surface of each of the palletized plating fixtures 118. The workpiece mounted on the palletized plating fixture is centrally positioned within the rectangular casing 115 adjacent the spray nozzles 116 when the spray housing is in the extended position. The spray housings are vertically movably supported on pipe members 119, 120 which extend upwardly through support brackets 121, 122 fixed to the angle plates 81, 82 or other adjacent portions of the frame. A spray nozzle pipe 123 is connected to the lower ends of the pipe members. The pipe 123 is connected to a solution source through suitable piping 124 which is integrally connected to one of the support tubes 120.

ANODE HOUSING

Referring now to FIGURES 5 and 13 where the anode housing 114 at station No. 5 is illustrated, each of the anode housing comprises an outer rectangular casing 128 formed of welded sheet steel or the like and having a lower peripheral rim portion 129 which may be provided with a seal or gasket 130 for sealing engagement with an upper surface of each of the palletized plating fixtures 118. A coupling block 131 is secured to the top of the outer casing 128 and is adapted to be connected to a piston rod 132 which is reciprocably actuable by a hydraulic cylinder 133 or other suitable power driven motor means mounted on top of one of the cross support beams 77 as shown in FIGURES 2 and 4. Locating pin support brackets 134, 135 are suitably fastened to opposite sides of the outer casing 128 and support centrally located guide pins 136, 137 which serve to locate the anode housing 114 relative to the palletized plating fixture 118.

ANODE HOUSING CONTROL MEANS

In order to stabilize movement of the anode housing 114 between the retracted position adjacent the upper cross support 77 and the extended position of cell forming engagement with the palletized plating fixture 118, sprocket wheel support brackets 140, 141 are suitably fastended to opposite sides of the outer casing 128. Each support bracket 140, 141 is provided with transversely extending horizontal shafts 142, 143 which are parallelly aligned and equally vertically spaced. Both ends of each shaft extend outwardly beyond the support bracket and rotatably support double sprocket wheel assemblies 144, 145. Only the apparatus on one side of the anode housing 14 is shown and hereinafter described in detail. It is to be understood that similar apparatus is provided on the other side of the anode housing. Thus, four sprocket wheels are mounted on each shaft in clusters 144, 145 of two sprocket wheels which are located at each of the corners of the casing 128. Two of four guide and support chains 146, 147 are provided on each side of the anode housing and each are connected at one end to one of four upper chain support brackets 148, 149 mounted on one of the upper cross supports. The other end of each chain is connected to one of four lower chain brackets 150, 151 mounted on the adjacent bracket plates 83, 84. Each chain is connected to the upper chain support bracket on one side of the anode housing and is connected to the lower chain support bracket on the opposite side of the anode housing. Each chain extends downwardly from the associated upper chain support bracket, winds around the lower surface of a first sprocket wheel located therebelow, extends across the anode housing to the opposite side thereof, winds around the upper surface of a second sprocket wheel aligned with the first sprocket wheel, and extends downwardly to the associated lower chain support bracket. Guide sleeve brackets 154, 155 are attached to the outer ends of the sprocket wheel brackets. A guide sleeve bracket is provided at each corner of the anode housing 114 for a purpose to be hereinafter described. In order to provide additional stabilization for the anode housing 114 adjustable guide bolts 156, 157 may be threadedly mounted on some of the guide sleeve brackets 155 and may be adjusted to position the ends thereof in close proximity to flanges of the adjacent upper vertical beam 70 to prevent lateral movement of the anode housing. A limit switch actuating arm support bracket 158 is mounted on the guide sleeve bracket 154 and carries actuating arms 159, 160 which are adapted to actuate limit switches 161, 162 mounted on the adjacent vertical frame 72.

The actuating mechanism previously described for the anode housings may be duplicated at all the stations. However, in order to reduce cost, a single housing actuating mechanism at a central station may be used to control movement of adjacent station housings. As shown in FIGURE 2, the spray housings 110, 112 at stations Nos. 2 and 4 may be rigidly connected to the anode housing 111 at station No. 3 by a frame 164 of welded plate steel so that movement of the anode housing 111 will cause similar movement of the adjacent spray housings 110, 112.

ANODE FIXTURE

Referring now to FIGURE 13, the anode housing 114 further comprises an anode fixture which is mounted within the outer casing 128. The anode fixture comprises a casting 166 which has a lower inner peripheral surface 167 contoured and configured to match the configuration of a workpiece 168 to be plated and to provide a flow passage 169 along the outer surface of the workpiece.

The anode material varies according to the nature of the processing at a particular station. For example, the alkali cleaning stations and the cyanide copper plating stations have cast iron anodes. The acid solution and nickel plating stations have cast iron anodes which are spray coated with a covering of .07 to 0.1 inch of lead. The chromium plating stations have cast aluminum anodes which are spray coated with a covering of .07 to 0.1 inch of lead. The thickness of the anodes are dependent on the amount of current applied, the amount of force which must be exerted thereon to obtain a satisfactory seal with the plating fixture, and other variables.

A peripheral rim 170 surrounds the contoured surface 167 of the anode casting 166 and has a substantially flat bottom surface 171 which is sealingly engageable with a portion of the palletized plating fixture 118 in the solution applying position. The upper portion of the anode casting is provided with spaced support posts 172, 173, which are rigidly secured to the anode casting 128 in any suitable manner. Slots 174, 175 are provided in the support posts to receive an electrical contact plate 176 which extends substantially the length of the anode casting and which is secured to a suitable connecting plate 177 at one end thereof. Insulating plates 178, 179 are provided between the contact plate 176 and the side surfaces of the slots to insulate the anode casing 128 from the anode casting 166. As seen from FIGURE 5, the connecting plate communicates with an electrical source via a flexible cable 180 and a bus bar 181.

CATHODE FIXTURE

Referring now to FIGURES 13–17, the palletized plating fixture 118 is shown to comprise a cathode fixture 185 formed about a hollow central casting 186 of any suitable material. The casting has a base portion 187 and an upwardly extending rectangular shell portion 188 in which a central cavity 189 is formed. A fluid inlet passage 190 and a fluid outlet passage 191 are cast integral with the casting 186. The inlet passage 190 terminates in an elongated channel 192 which is adapted to connect the inlet passage 190 to the flow passage 169 along the entire width of the workpiece 168. The outlet passage 191 has an enlarged opening 193, immediately adjacent the end of the workpiece 168, which extends the entire width thereof. The inlet passage opens along the bottom surface of the base portion 187 and the outlet passage terminates at the bottom surface thereof. A plurality of cable ports 195, 196 are spaced around the periphery of the shell portion 188 and open into the central cavity 189 of the casting which provides a central cable passage. A clamp cavity 197 is cast integrally adjacent to the outlet passage 191 to accommodate clamping means for securing the workpiece 168 to the cathode fixture. As shown in FIGURES 13, 14, the clamping means comprise a control shaft 199 which extends through the casting 186 and is rotatably supported thereby. Suitable sealing means, such as neoprene seals, are provided about the periphery of the shaft 199 to prevent leakage from the clamp cavity 197. The outer end of the control shaft 199 is connected to a drive coupling, such as a connecting nut 200. A suitable tool 201 having a socket adapted for engagement with the nut 200 is provided to rotate the control shaft 199. A bifurcated link 202 is operably fastened to the control shaft 199 and pivotally supports an intermediate link 203 which is pivotally secured to a latch plate 204. A pin member 205 is mounted in the clamp cavity 197 in any suitable manner and rotatably supports the latch plate 204. A neoprene clamp pad 206 is secured to the latch plate 204 and is adapted to retainingly engage a transverse portion 207 of the workpiece 168. The latch mechanism is made from stainless steel to prevent corrosive deterioration thereof. It is to be understood that the latch mechanism may be varied to accommodate the design of a particular part being plated.

All exterior surfaces of the casting 186 are covered with a suitable protective coating 210. A preferred material is the commercially available plastisols. A plastisol shell is formed on the upper portion of the casting shell portion 188 and is provided with a contoured upper surface 211 which duplicates a workpiece surface to be supported thereon. Electrode plate cavities 212, 213 are integrally formed in the plastisol shell 210 and are aligned with the cable ports 195, 196 in the casting shell 188. The plastisol shell 210 is formed integrally with a plastisol coating 214 of at least 3/16 of an inch which is provided on all exterior surfaces of the casting 186. The integral plastisol coating 214 is also provided in the inlet passage 190, the outlet passage 191 and around the clamp cavity 197. The contoured molded surface 211 of the shell of plastisol 210 surrounds the clamp cavity 197 and provides an upwardly extending opening through which the latch mechanism extends. A minimum coating 215 of at least 1/16 of an inch of plastisol is provided on all interior surfaces of the casting 186 which are subject to contact with processing solution. A substantially flat rim surface 216 is provided around the entire periphery of the contoured upper surface 211 which receives the part to be plated. A neoprene seal 217 is mounted on the rim 216 by any suitable fastening means and extends continuously therearound. If desired, the seal 217 may be mounted on the surface 171 of the anode to promote drainage from the cathode fixture. Suitable metallic reinforcing members, such as the member 218 shown in FIGURE 15, are provided around the inner periphery of the plastisol shell 210 to provide additional support and to decrease the amount of plastisol needed to obtain the desired contoured upper surface 211. A plurality of bolt holes 219 are provided in the base portion 187 to enable the cathode fixture to be secured to a pallet.

A cable holder 221 of copper or other suitable conducting material is mounted in the hollow interior 189 of the casting 186. A plurality of flexible connecting cables 222 are connected to the cable holder 221 by suitable fastening means 223 and extend upwardly therefrom to and through the cable ports 195, 196 provided in the periphery of the shell portion 188. Individual lead-in cable ports 225, 226, 227, 228, 229, 230 are integrally molded in the plastisol shell 210 and connect the electrode contact cavities 212, 213 with the central cavity 189 of the casting shell portion 188 through the cable ports 195, 196 provided therein. Since each of the lead-in cable ports are similarly formed, only the details of lead-in port 228 are described in detail.

As shown in FIGURES 13 and 16, the lead-in port 228 comprises stepped portions 231, 232, 233 of progressively wider dimensions to provide shoulders 234, 235 in the adjacent plastisol shell 210. The flexible cable 222 is provided with a connecting head 236 to which a retaining plate 237 is secured. The retaining plate is supported in the stepped portion 232 on a neoprene seal 238 which is seated on the shoulder 234. A pair of leaf spring electrical contact plates 239, 240 are secured to the connecting head 236 in any suitable manner and extend upwardly therefrom through a neoprene spacing and sealing member 241 seated on the shoulder 235. The spring contacts 239, 240 normally extend upwardly to points slightly beyond the outer surface 211 of the plastisol shell 210. The end surfaces 242, 243 of the spring contacts are contoured for full contacting engagement with the lower surface of the workpiece 168. As a workpiece is clamped on the plastisol surface 211, the flexible contacts are flexed downwardly and inwardly from the normal unflexed position to obtain suitable electrical contact with the workpiece. Any suitable number of cables and spring contacts may be provided. The location of the spring contacts may also be varied depending upon the characteristics of the part to be plated. As shown in FIGURE 13, retaining bars 244, 245 extend the length of the electrode cavities 212, 213 to secure the spring contacts and lead-in cables in place.

The particular workpiece shown for illustrative purposes in FIGURE 13 is a section of an automobile bumper having a configuration which provides a detent portion 248 adjacent the inlet orifice 192 in addition to a transverse flange 207 formed adjacent the other end thereof which is engageable by the clamp plate 206. Rotation of the clamping plate 206 into engagement with the adjacent surface of the transverse flange 207 of the workpiece forces the workpiece downwardly into firm engagement with the outer surface of the plastisol shell 211 and with the flexible contacts 239, 240. Any suitable latching mechanism may be provided to accommodate particular types of workpieces having different configurations. A detent or clamp arrangement could also be provided adjacent the inlet port 190 if the workpiece configuration were such as to require additional clamping means. Electro magnetic means might also be provided to clamp a workpiece through suitably located magnets in the plastisol shell. In order to insure proper flow of processing solution across the workpiece 168, additional inlet ports may be provided along the length of the flow passage 169. For example, as shown in FIGURE 14, a supplementary inlet orifice 250 may be formed in the anode housing 166 and connected to a source of plating solution through a flexible conduit 251. As many additional inlet ports may be provided as is necessary to obtain sufficient application of plating solution at portions of the workpiece having complex contours and configurations. Suitable flow directing means, such as a Teflon guide tube 252 or the like, may be provided at the inlet orfice 253 to direct flow of processing solution upwardly along the side surfaces of the workpiece. Gates, troughs or other devices may be substituted for the Teflon tube and integrally formed in the plastisol shell adjacent to the workpiece to direct flow at the beginning of the flow path to obtain uniform application of plating solution.

An alternative embodiment of the cathode fixture is shown in FIGURE 22 and comprises a shell 296 of Fiberglas made with a polyester resin instead of the aforedescribed casting. The workpiece 168 is clamped on a peripheral seating surface 297 against a seal element 298 integrally molded therein. The workpiece contacts the cathode fixture only along the relatively narrow seating surface 297 in which a seal is embedded. Electrical contacts 299 are sealed in the Fiberglas shell and engage the workpiece in the aforedescribed manner. The other peripheral portions of the cathode fixture are relieved at 300, 314, 315 relative to the workpiece to facilitate positioning and clamping of the workpiece thereon. The lower surfaces 316, 318 are downwardly sloped to facilitate drainage and the anode seal 319 is secured to the anode casting rather than to the cathode fixture. The other parts associated with the cathode fixture are identical to those previously described.

PALLET

Referring now to FIGURES 5, 12, 13, 14 and 20, the pallet portion of the palletized plating fixture comprises a base plate 254 to which are welded or otherwise suitably fastened, upwardly extending rim plates 255, 256, 257, 258 which form a centrally located enclosure 259. The top surface of the base plate 254 is provided with a central recess within the confines of the central enclosure. As shown in FIGURE 13, the anode housing rim 129 is adapted to be seated within the recess 260. The peripheral seal 130 provided in the anode housing rim 129 is sealingly engaged with the top surface of the recess 260 when the anode housing 114 is seated thereon.

As shown in FIGURE 20, support plates 261, 262 are welded or otherwise suitably fastened to the outwardly extending side surfaces of the base plate 254. Bracket assemblies 265, 266 are mounted on the support plates 261, 262 and include bushing members 267, 268 having guide pin holes 269, 270 which are adapted to receive and retain the guide pins 136, 137 carried by the anode housing 114. Transfer blocks 271, 272, 273, 274 are bolted to the lower surface of the base plate 254 and extend downwardly therefrom. Each of the transfer blocks is provided with dog receiving slots 275, 276, 277, 278 for connecting the pallet to power transfer mechanism for movement of the pallet from station to station. Pallet support bars 279, 280, for supporting the palletized plating fixture during movement from station to station, are spaced inwardly of the transfer blocks and extend transversely of the base plate 254. As shown in FIGURE 13, the support bars 279, 280 are suitably fastened, as by welding, to the base plate 254.

Figure 12:
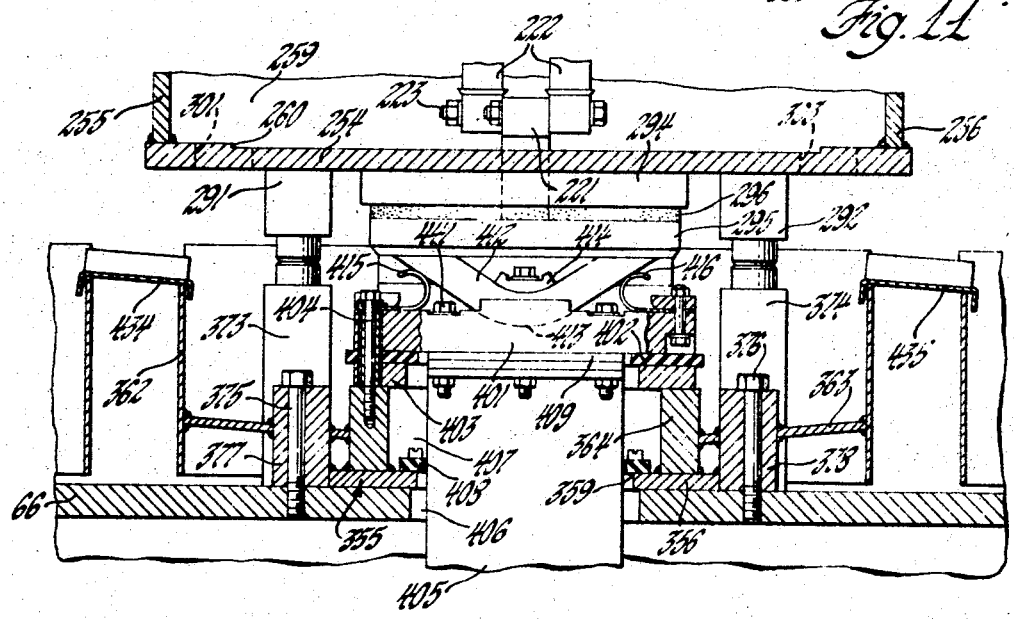

Referring now to FIGURE 13, guide rails 281, 282, having downwardly and inwardly inclined side surfaces 283, 284 and 285, 286 which form a V cross section, are secured to the support bars 279, 280. The base plate 254 is provided with an inlet port 287 and an outlet port 288 which are coaxially aligned with the fluid inlet passage 190 and the fluid outlet passage 191 in the cathode fixture. Annular bosses 289, 290 are secured to the lower surface of the base plate 254 and are concentrically mounted relative to the inlet port 287 and the outlet port 288. As shown in FIGURE 12, a plurality of stop blocks 291, 292 are fastened to the lower surface of the base plate 254 for supporting engagement with corresponding stops provided at each of the anode stations. An electrical connecting port 293 is centrally located on the base plate 254 and a housing 294 is formed therearound. An electrical contact plate 295 is bolted or otherwise suitably fastened to the lower end of the housing 294 and is separated therefrom by an insulating gasket 296. A portion of the cable holder 221 extends downwardly through the electrode connecting port 293 provided in the pallet base plate 254 and is fastened within the housing 294 to the electrical contact plate 295. The electrode connecting arrangement may be insulated and sealed from the pallet by gaskets made of polypropylene or other suitable material. As shown in FIGURE 20, a plurality of drain slots 301, 302, 303, 304 are provided around the periphery of the recess 260 to permit drainage of processing solution through the pallet and a plurality of cathode fixture fastening holes 306 are also provided to secure the cathode fixture on the pallet. Any of the surfaces of the pallet which are subject to contact with processing solution may be provided with a plastic coating of any suitable material, such as the commercially available plastisols; and suitable material, such as the commercially plastisols and suitable neoprene seals are provided at all the joints to prevent leakage of processing solution.

VERTICALLY MOVABLE CONVEYOR MEANS

Figure 5A:
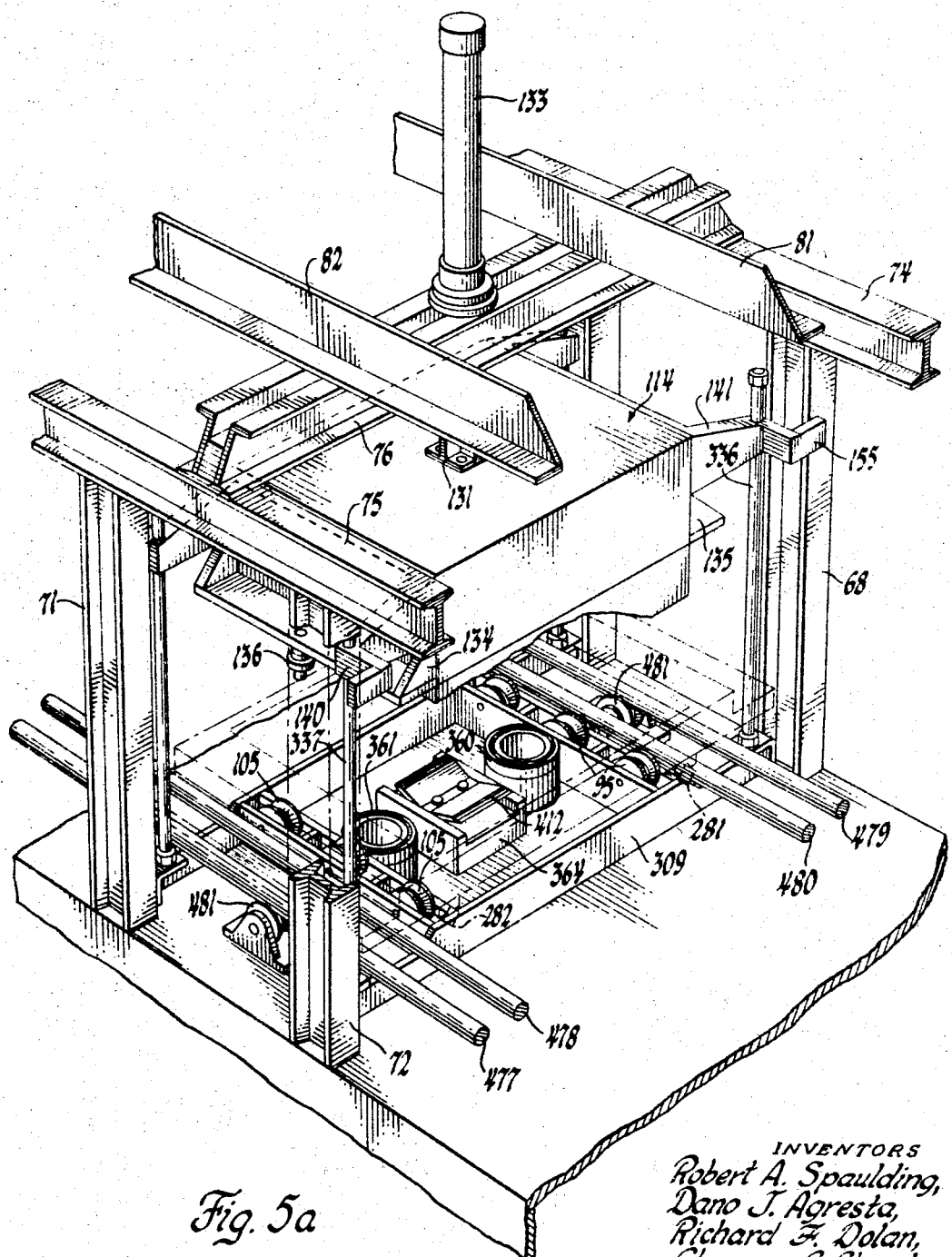

As shown in FIGURES 3, 5 and 5a a special roller conveyor frame 307 is provided at the anode stations to permit sealing engagement between the palletized plating fixtures 118 and processing equipment permanently located at each anode station. Referring now to FIGURES 3 and 5a, the roller conveyor frame 307 is made by welded construction of plate metal and comprises parallel transverse side support plates 308, 309 which have a length greater than the corresponding dimension of the palletized plating fixture so that the ends thereof extend outwardly adjacent the lower column supports 67, 68, 71, 72 on each side of the conveyor line. Cross support plates 310, 311 and 312, 313 are welded to and extend between the parallel sides plates 308, 309. Each pair of cross support plates are divided into compartments for the conveyor rollers 95, 105 and each cross support plate rotatably supports three conveyor rollers. Each roller compartment comprises aligned shaft apertures in which a shaft member is fixably secured. As shown in FIGURE 13, conveyor rollers 95, 105 are rotatably mounted on the shafts in each compartment between thrust washers 320, 321, 322, 323, which are suitably mounted on the shaft between the conveyor rollers 95, 105 and the adjacent side surfaces of the cross support plates. All of the rotatably mounted conveyor rollers 95, 105 are provided with V-shaped grooves 324, 325 to receive the guide bars 281, 282 fastened to the pallet.

Referring again to FIGURE 3, support blocks 326, 327, 328, 329 are mounted at each end of the transverse plates 309, 308 and bracket members 330, 331, 332, 333 are welded between the outer roller support plates 310, 313 and the side plates 308, 309 to provide additional support. The block members are provided with vertical apertures, each of which are adapted to receive vertically extending support rods 336, 337 as shown in FIGURE 5. It is to be understood that four support rods are provided, one at each corner of the roller frame 307. The vertically extending support rods 336, 337 are threadably fastened to the support blocks 326, 328 for actuation of the conveyor frame 307 between a lower retracted position and an upper conveyor forming position whereat the conveyor rollers 95, 105 are rigidly supported in horizontal alignment with the similar conveyor rollers provided at the other work stations. Guide means are provided for guiding the conveyor frame between the retracted position and the conveyor position, and comprise guideway blocks which are secured to the machine conveyor platform 66, and cooperating guide blocks, which are fastened to the side surfaces of the outer roller support plates 313, 310. The support rods 336, 337, which are fastened to each corner of the periphery of the roller frame, extend upwardly through guide sleeves provided in the bracket extensions 154, 155 of the anode housing 114. The upper ends 344, 345 of the control rods 336, 337, as shown in FIGURE 5, are provided with flanged stop members 346, 347, which are securely fastened thereto by suitable means such as threaded nuts 348, 349 or the like. The stop members 346, 347 provided on the control rods are adapted to be seated on the outer top surfaces 350, 351 of the anode housing brackets 140, 141 during movement of the anode housing 114 to the retracted position.

As the anode housing 114 is moved to the retracted position by the actuating cylinder 133, the upper surfaces 350, 351 of the support brackets engage the flanges 346, 347 of the control rods and raise the roller frame 307 to a position of roller engagement with the guide bars 281, 282 of the palletized plating fixtures 118 and to a position whereat the roller members are horizontally aligned with the other roller members of the machine to provide a continuous roller conveyor. Thus, as a palletized plating fixture is received at a particular anode work station, the roller frame is in the raised position and the rollers thereof receive the pallet for positioning at the particular work station. After the pallet is in position at the particular work station, the actuating cylinder moves the anode housing downwardly for engagement with the palletized plating fixture and the roller frame is simultaneously lowered during the initial portion of the stroke of the actuating cylinder to a position whereat the roller frame is seated on the supported platform 66 and the roller members carried thereby are moved downwardly out of engagement with the guide bars provided on the pallet, as shown in FIGURE 13. In this manner, the palletized plating fixture may be lowered into processing position at each of the anode stations.

ANODE SINK

Referring now to FIGURES 3 and 5a, an anode sink structure 355, as shown at station No. 3, is provided for all of the anode stations. As shown in detail in FIGURES 12 and 13, a lower sink support plate 356 extends across the machine frame and is fixed to the support platform 66. A fluid inlet port 357, a fluid outlet port 358 and an electrical connecting port 359 are provided in the lower support plate 356. Annular housings 360, 361 are welded or otherwise secured to the lower support plate 356 and are concentrically positioned around the inlet port 357 and outlet port 358. The anode sink further comprises a rim portion 362 which is welded to the lower support plate 356 and to the inlet and outlet housings 361, 360. A downwardly sloping floor plate 363 is welded or otherwise suitably secured to the inner side walls of the rim portion 362 at a point spaced above the top surface of the lower support plate 356. A rectangular housing 364 is formed around the electrical connecting port 359 and extends upwardly therefrom. The floor plate 363 slopes downwardly from the rim portion 362 and surrounds the housing members 360, 361 and 364. As shown in FIGURE 3, support plates 365, 366, 367 may be welded between each fluid housing 360, 361 and the electrical connecting housing 364 to provide additional support. A drain port 370, illustrated in FIGURE 13, extends through the outlet housing 360 from a point adjacent the lowermost surface of the sloping floor plate 363. Referring again to FIGURES 3 and 12, a plurality of stop posts 371, 372, 373, 374 are secured to the outer edges of the lower support plate 356 and extends upwardly through the sloping floor plate 363 to a point adjacent the top of the sink structure. The stop members 371, 372, 373, 374 are positioned to be engaged by coaxially aligned stop blocks 291, 292 which are mounted on the pallet plate 254 and extend downwardly therefrom to support the palletized plating fixture when the conveyor frame is in the retracted position. The sink may be connected to the platform 66 by bolts 375, 376 extending through bolt blocks 377, 378 formed integral with the stop blocks 373, 374 as shown in FIGURE 13 with a counterbore 380 on the top surface thereof which receives a threaded coupling member 381. A Saran-lined pipe 382 extends upwardly from a process solution pump through an inlet port 383 in the plate 66 into threaded engagement with the coupling member 381. A cover plate 384 is bolted or otherwise secured to the top surface of the annular housing 361 and extends radially inwardly beyond the threaded coupling member 381 for securement thereof in the counterbore 380. A gasket 385 is provided between the cover plate 384 and the threaded coupling member 381, and is fixably secured therebetween by engagement with the end of the Saran-lined pipe 382. The cover plate 384 has a central port 386 having a conically outwardly tapered surface 387 which terminates in substantial alignment with the inlet passage in the annular inlet housing 289 depending from the pallet. An O-ring 388 or other suitable sealing gasket of neoprene or the like is seated in a groove 389 surrounding the inlet opening of the cover plate 384 and is adapted for sealing engagement with the lower surface of the pallet inlet housing 289 when the conveyor roller frame 307 is in the retracted position as shown. A commercially available Saran-lined pipe 390 extends upwardly from the solution tank through an outlet port 391 provided in the conveyor platform 66. A threaded coupling ring 392 is welded or otherwise secured within the outlet opening 358 in the lower support plate 356 of the sink and a counterbore 393 in the lower portion of the outlet housing 360. A second counterbore 394 extends upwardly from the threaded coupling ring 392 and intersects the drain opening 370. A support plate 395 is bolted or otherwise secured to the top surface of the outlet housing 360 and is provided with a top surface adapted to abut the lower surface of the outlet housing 290 of the pallet. Suitable sealing means 396 are provided between the support plate 395 and the outlet housing 290 of the pallet to provide sealing contact therebetween when the conveyor roller frame 307 is in the retracted position as shown in FIGURE 13. In addition, all surfaces of the sink which are subject to contact with processing solution are provided with a plastisol coating to prevent corrosive action. Thus, the interior surfaces of the inlet housings of the pallet and the sink and the interior surfaces of the outlet housings of the pallet and the sink are coated with a suitable corrosive resistant plastic.

As shown in FIGURES 12 and 13, a contact support plate 401 is mounted on an insulating gasket 402 and plate 403, and secured to the electrical connecting housing 364 by suitable means, such as the bolts 404. A bus bar 405 extends upwardly through a port 406 provided in the support platform 66 and into the cavity 407 formed within the electrical connecting housing 364. A gasket 408 surrounds and seals the bus bar 405 within the cavity 407. Transversely extending portions 409, 410 are secured to the contact support plate 401 by a plurality of bolts 411 or the like. Flexible contacts 412 are supported in a curved seat 413 on the top surface of the contact support plate 401 and extent upwardly in a V-shaped pattern a sufficient distance to make electrical contact with the contact plate 295 of the pallet when the conveyor roller frame 307 is in the retracted position. The flexible contacts are secured to the seat 413 by a curved retaining bar 414. A plurality of spring members 415, 416 are secured to the contact support plate 401 beneath the flexible contacts 412 and serve to bias the flexible contacts upwardly above the normal contact position to insure good electrical contact when the pallet is in the lowermost position with the stop members 291, 292 and 373, 374 engaged. The electrical connector housing 364 is suitably sealed from the sink. It is to be noted that all surfaces of the pallet and sink which are subject to contact with the plating solution are also coated with protective plastic of any suitable composition, such as the commercially available plastisols; and suitable neoprene seals are provided at all the joints to prevent leakage of the plating solution.

Referring now to FIGURES 3 and 4, the sink structure provided at all non-electrical stations is shown in detail at station No. 3. It is not necessary to effect a complete sealing engagement between the palletized plating fixture 118 and the sinks located at the rinse stations; and therefore the sinks at the rinse stations are of different structure than those provided at the electrical stations. The sink 420 at station No. 4 is made of welded construction of sheet steel which has all exposed surfaces provided with a protective coating of plastisol. The sink 420 is a pan-like structure having upwardly extending side walls 421 and having a downwardly inclined bottom surface 422 which slopes to an outlet port 423. The sink is directly supported on the platform plate 66 by a plurality of support blocks 424 which extend upwardly therefrom. A pipe coupling ring 425 is welded to the bottom surface of the sink circumjacent the outlet port 423 and is fixed to a support ring 426 that is welded or otherwise secured to the platform plate 66. A Saran-lined pipe 427 is threadedly inserted into the threaded coupling ring 425 and extends downwardly through an outlet port provided in the support plate 66 to suitable solution receiving means. As shown in FIGURE 2, at station No. 5, the Saran outlet pipe 428 depending from the sink 429 may be connected to the drain pipe 64 by means of suitable flange couplings 430. A drain pipe is used at some of the non-electrical stations whereat the processing solution is rinse water or the like which may be conducted directly to a central drain system. As shown in FIGURE 4, the outlet pipe 427 extends from the sink 420 to an inlet port 432 in the tank 91 provided below the station. As shown in FIGURE 12, drain back troughs 434, 435 extend between adjacent sinks to convey processing solution, which drips from the palletized plating fixtures 118 during transfer, into the sink at the previous station.

SOLUTION TANKS

Referring now to FIGURE 4, each of the process solution tanks, such as tank 91 at station No. 4, is conventionally constructed of steel plate. Each of the tanks of the machine is commonly provided with a suitable pump mechanism 94 comprising a motor 437 and an impeller section 438 which are supported on a support bracket 439 on the top of the tank. An inlet pipe 440 extends downwardly from the impeller section 438 and is normally imersed in processing solution within the tank. An outlet conduit 441 extends upwardly from the impeller section 438 and through the top of the tank for connection with the inlet piping 124 which connects the spray apparatus 116 in the shroud housings 115. Suitable valve mechanism 442 and a flow meter 443 may be provided to control flow of processing solution to the spray unit. At the electrical stations, the outlet conduit 441 extends from the impeller housing 438 beneath the support platform 66 and is connected directly to the solution inlet pipe 382 shown in FIGURE 13. A heating element 444 is mounted within some of the tanks and some of the tanks are connected to remotely locate regeneration tanks (not shown) by suitable piping 445. The copper solution, which is depleted by deposition of copper on the parts, is replenished by a porous diaphragm regeneration system. In this system a steel cathode is placed inside a porous ceramic diaphragm which is filled with a suitable cyanide solution such as potassium cyanide or sodium cyanide. Other materials, such as potassium or sodium hydroxide, while will promote conductivity are also used. Copper on copper anodes is dissolved into the solution by passage of electric current between the anode and cathode. Copper is prevented from reaching the steel cathode by the porous diaphragm and materials associated therewith. The nicket plating solutions are regenerated by the use of nickel salt, such as nickel carbonate, nickel oxide or nickel hydroxide in the solutions. The chromium plating solution is regenerated by the use of conventional chromium salts or chromic acid in the solution. A ventilation exhaust vent 446 may be positioned above the tanks and a second ventilation exhaust duct 447 may be positioned at each work station to provide adequate ventilation.

It is to be understood that conventional circuitry and control mechanism is provided to actuate the housings at each work station from the retracted position to the extended position and to control actuation of each of the pump mechanisms. Since the circuitry and control mechanisms are well known and may be readily applied to the subject machine by those skilled in the art, no detailed reference is made thereto. Referring now to FIGURES 5, 20, and 21, a locating detent means 450 is mounted on a longitudinally extending support plate 83 and centrally positioned at each station. A detent 451 is biased inwardly toward the palletized plating fixtures by a spring element 452 within a guide housing 453. A locating plate 454 having a vertical groove 455 is fixed to one of the support brackets 265 of the pallet and is provided with cam approach and withdrawal surfaces 456, 457 for locating the detent members within the groove 455 when the pallet is centrally positioned at the work station. When the detent 451 is suitably positioned within the groove 455, a switch 458 is actuated by engagement of a cam block 459 with roller arm 459a on the plate 83 to permit further actuation of the control circuit. Thus, the control circuitry cannot be actuated to start the processing cycle until the pallet is exactly positioned at each station. After the palletized plating cells are properly located at each station, the control circuitry actuates the housing control cylinders to lower the housings into processing cell forming engagement with the palletized plating fixtures. As shown in FIGURE 5, the limit switches 161, 162 are provided on an adjacent column support 72 of the machine frame at each work station and have actuating fingers which extend outwardly into the path of movement of the cam actuating blocks 159, 160 which are fixed to one of the anode housing support brackets. The lower limit switch 161 is actuated when the anode housing is in its lower-most position in sealing engagement with the pallet and controls the pump motor so that the motor is energized and processing solution is pumped upwardly from the tank and through the inlet housing for flow over the workpiece between the anode fixture and the cathode fixture. In addition, actuation of the switch 161 starts an electric timer. When the timer times out, before the standard stop time elapses, conventional circuitry de-activates the pump and actuates the anode housing cylinder to retract the housings. In addition the switch 161 starts the D.C. current which energizes the workpiece at the electrical station. The electric timer also stops the D.C. circuit. The upper limit switch 162 is actuated when the anode housing reaches the uppermost position to signal that the anode housing is in the retracted position and to permit the palletized plating fixture to be transferred to the next station.

Referring now to FIGURE 3, a control switch mechanism 460 is provided at the first and last stations of the machine to prevent initiation of a transfer cycle before a palletized plating fixture is positioned at station No. 1 and before the palletized plating fixture a station No. 32 has been removed. The mechanism comprises a cam roller 461 which is mounted on a pin 462 in a bifurcated control arm 463. A switch actuating member 465 is connected to the control arm 463 in any suitable manner. The control arm 463 is rotatably supported in the conveyor roller frame 466. The cam roller 461 extends upwardly into the path of the guide bars 281, 282 on the pallet and is engaged thereby when a palletized plating fixture is in position on the conveyor rollers. Brake mechanism comprising shoe members 468, 469 having V-shaped friction surfaced grooves 470, 471 are mounted on the conveyor roller frames and extend upwardly for frictional engagement with the guide bar of each of the palletized plating cells. Each shoe is spring biased upwardly to produce a frictional retarding force on the pallet as they are moved into position at station No. 1.

THE TRANSFER MECHANISM

Referring now to FIGURE 3, transfer mechanism for actuating the palletized plating fixtures from station to station along the conveyor line on the machine is shown mounted on the transfer mechanism support plate 86. The transfer mechanism comprises, in general, a carriage assembly 474 which is reciprocably mounted on a trackway 475 and actuably connected to a power cylinder 476. The carriage is adapted to move transfer rods 477, 478 and 479, 480 which are slidably and rotatably mounted on guide blocks 481 longitudinally of the machine.

Referring now to FIGURE 6, the carriage assembly 474 is formed about a carriage plate 484. The trackway 475 comprises a central guideway and spaced side guideways. The central guideway comprises a downwardly depending housing 485 secured to the carriage plate 484 by welding, or other suitable means, and including a lower guide plate 486 which is fastened to downwardly depending side plates 487, 488 by bolts or the like. The guide plate 486 is slidably supported between spaced guide rails 489, 490 that are mounted by bolt members onto support blocks 491, 492 which are welded or otherwise suitably fastened to the base plate 86. Support flanges 493, 494 may be additionally provided between the side support plates 487, 488 and the carriage plate 484. An axle rod 495 is rotatably mounted within the side support plates 487, 488 and extends substantially from end to end of the carriage plate 484.

Identical transfer rod actuating means are provided on both sides of the carriage and therefore only one of the actuating means is hereinafter described in detail. The axle rod 495 is rotatably supported at its outer end within a bearing sleeve 497 provided in an axle housing 498 which is welded or otherwise suitably fastened to the carriage assembly. Each of the spaced side guideways comprise a guide rail 499 which is suitably fastened to the bottom surface of the axle rod housing 498 and slidably supported on a slide block 501. An inwardly extending portion of the guide rail 499 is adapted to be received within a guide groove 502 provided by block members 503, 504 which are secured to the base plate 86. A gear member 505 is keyed or otherwise suitably fastened to a reduced end portion of the axle rod 495 and is engagable with a rack element 506 which extends transversely of the carriage plate and parallelly to the guideways. The rack element 506 is fixably secured to the base plate through a support plate 507 and is positioned between thrust blocks 508, 509. A connecting rod 510 is fastened to the carriage assembly by a suitable coupling formed of retaining blocks 511, 512 which are fixedly secured within the downwardly depending housing 485. A T-shaped groove (not shown) is provided by the connecting blocks 511, 512 and receives a T-shaped coupling 513 which is fastened to the end of the piston rod 510. The other end of the piston rod 510 is connected within the power cylinder 476 so that actuation thereof causes reciprocable movement of the carriage assembly within the guideways provided. As shown in FIGURES 3 and 6, suitable limit switches 516, 517 are provided in the path of movement of the carriage assembly. A limit switch actuating dog 518 may be suitably fastened to the carriage plate and extends downwardly therefrom for engagement with the limit switches 516, 517 at the extreme forward position of the carriage and at the extreme rearward position of the carriage. The limit switches 516, 517 control transfer bar apparatus in a manner to be hereinafter described in detail. A cushioned stop block 519 is provided at the forward end of the guideways.

Referring again to FIGURES 3 and 6, a power cylinder 520 is centrally located on the carriage plate 484 and is fastened thereto through a cylinder support plate 521 by bolt members or other suitable fastening devices. Cylinder rods 522, 523 extend outwardly from each end of the power cylinder 520 transversely of the path of movement of the carriage assembly 474 and are adapted to be connected through yoke members 524, 525 to actuating mechanism which controls the transfer rods 477, 478 and 479, 480.

Since the palletized fixture actuating mechanism is identical on both sides of the carriage, only the left-hand mechanism will be described in detail. Although a pair of transfer rods 477, 478 and 479, 480 are provided on each side of the carriage assembly 474, any number of transfer rods may be provided depending on the particular cycle of movement of the palletized plating fixtures desired to be obtained. In the illustrated preferred embodiment, the two transfer rods per side are adequate. Referring now to FIGURES 6–10, the outer transfer rod 479 is supported within a cylindrical housing 528 that is welded or otherwise suitably secured to a block housing 529 which is fastened to the carriage plate 484 and to the axle rod housing 498. The inner transfer rod 480 is supported within the block housing 529. A cylindrical transfer rod actuating mechanism housing 530 is rigidly fastened to the block housing 529 and to the outer transfer rod housing 528 by welding or other suitable means so that a compact and integrated housing arrangement is provided. A reduced end portion 531 of the outer transfer rod 479 is fixably mounted within a rack sleeve 532. The rack sleeve 532 is provided with rack teeth 533 along its lower surface and is adapted to engage the gear member 505 fixed on the end of the axle rod 495. The outer transfer rod housing 528 is provided with an opening 534 to receive the gear member 505 and permit meshing engagement thereof with the rack sleeve 532. A gear 535 is integrally formed on a hub member 536 which is connected by a longitudinal key element 537 to one end of the reduced end portion 531 of the outer transfer rod 479 through a longitudinal slot 538 in the rack sleeve 532. The gear hub member 536 is mounted circumjacent and slidably supports the rack sleeve 532. Suitable bearing sleeves 539, 540 rotatably support the reduced end portion 531 of outer transfer rod 479 within the rack sleeve 532. The slot 538 has an arcuate width sufficient to permit approximately a ¼ turn of the transfer rod 479 relative to the rack sleeve 532. A bearing bushing 541 is secured in one end of the cylindrical housing 528 by a cover plate 542 and slidably supports the rack sleeve 532. The hub member 536 is rotatably supported within the cylindrical housing 528 by spaced bearing sleeves 545, 546 which are secured within the housing by a cover plate 547. Thus, the transfer rod 479 is slidable relative to the gear 535 and is also rotatably actuable thereby throughout all positions of the carriage assembly.

Figure 8:
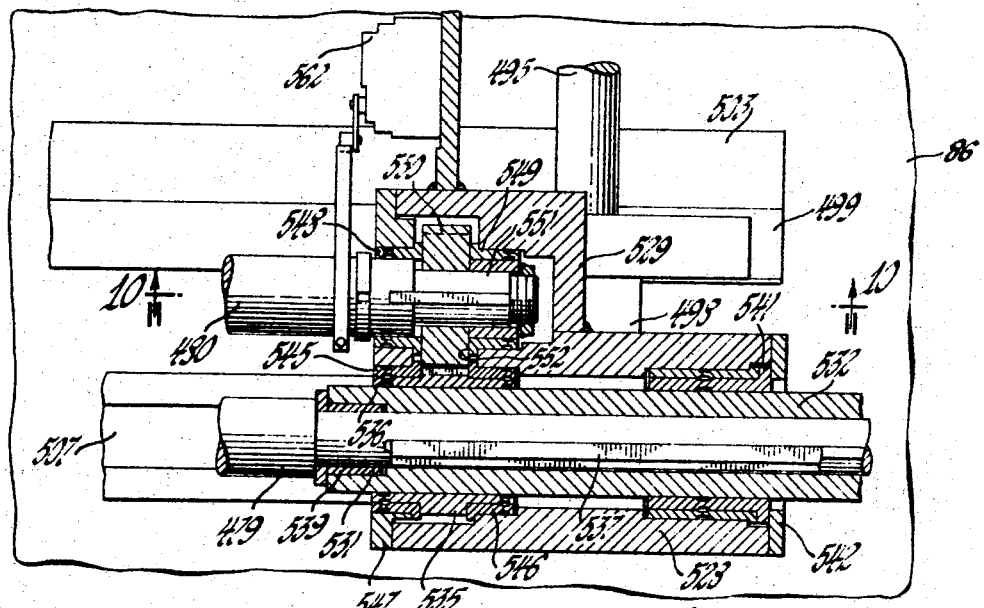
Figure 9:
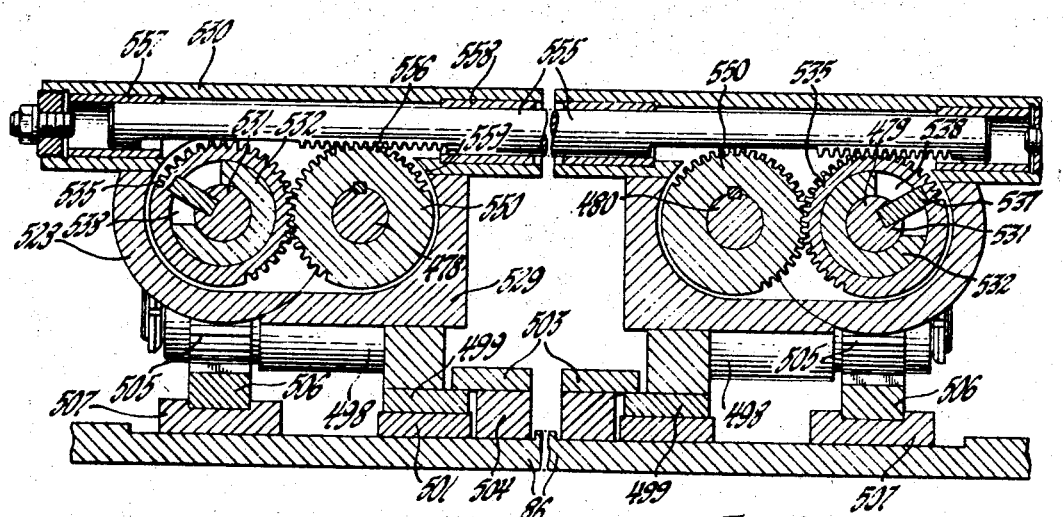
Figure 10:
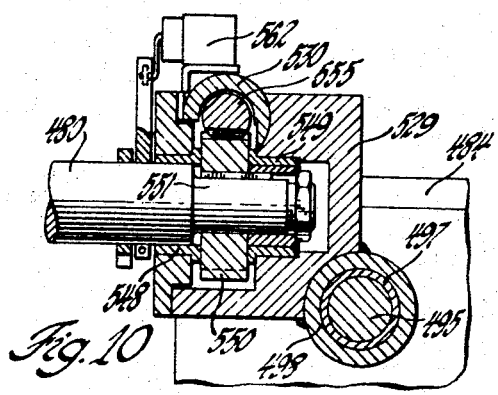
Figure 11:
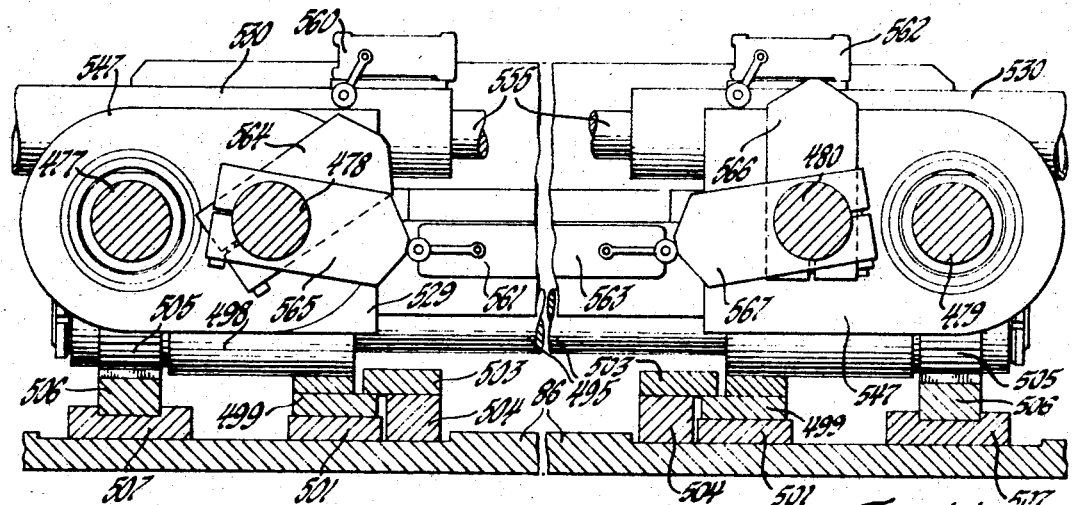

As shown in FIGURES 8 and 10, the inner transfer rod 480 is rotatably supported within spaced bearing sleeves 548, 549 in the housing 529 and has a drive gear 550 keyed to a reduced portion 551 thereof. The cover plate 547 also retains the bearing sleeves 548, 549 in the housing 529. The bearing sleeves 545, 546, for the outer transfer rod drive gear 535, and the bearing sleeves 548, 549, for the inner transfer rod drive gear 550, extend within an opening 552 between the housing 529 and the housing 528, and define a gear passage to permit meshing of the outer transfer rod drive gear and the inner transfer rod drive gear. The cover plate 547 is adapted to surround the gear components and be fastened to the end surfaces of the block housing 529 and the outer transfer rod housing 528. An actuating rod 555 is connected through the yoke 524 to the connecting rod 522 of the double acting cylinder 520 and is provided with rack teeth 556 on its lower surface. The actuating rod is reciprocably supported within the actuating mechanism housing 530 by sleeve bearings 557, 558. The rack teeth 556 are drivingly engaged with the inner transfer rod drive gear 550 through an opening 559 in the housing 530 and the drive gear 550 is drivingly engaged with the outer transfer rod drive gear 535. In this manner, the rack drives the gears 535, 550 in opposite directions. As shown in FIGURE 11, limit switches 560, 652, 563 are secured to the carriage assembly in any suitable manner. The limit switches are controllably connected to the double acting cylinder 520 to control movement thereof between a central position and extended positions on both sides of the carriage assembly and to the cylinder 476. Switch actuating dogs 564, 565 and 566, 567 are mounted on the inner transfer rods 480 and 478, respectively.

As shown in FIGURES 5 and 19, a pair of pallet engaging dogs 568, 569 and 570, 571 are removably fixed to the inner transfer rods 480 and 478, respectively, at spaced intervals therealong and single pallet engaging transfer dogs 572 and 573 are fixed to the outer transfer rods 479 and 477, respectively, at spaced intervals therealong. The dogs are adapted to be received in the slots 275, 276, 277, 278 provided in the blocks 271, 272, 273, 274 on the pallet for driving engagement therewith. The dogs are removably secured to the transfer rod so that various transfer cycles may be provided by the various spacing arrangements of the dogs. In the preferred embodiment of the invention which is illustrated, the inner transfer rod is adapted to move each pallet two feet, which is the distance between centers of adjacent work stations, and the outer transfer rod is adapted to move pallets four feet so that under some circumstances stations may be by-passed for a purpose to be hereinafter described.

OPERATION OF TRANSFER MECHANISM

The operation of the transfer mechanism comprises movement of the carriage assembly 474 from a retracted position to an extended position. The carriage assembly, for purposes of illustration of the preferred embodiment, is adapted to move a distance of two feet. The power transfer cylinder 476 is conventionally actuated to drive the carriage assembly between the retracted position and the extended position at predetermined time intervals. The carriage assembly is moved from the retracted position to the extended position a distance of exactly two feet. Forward movement of the carriage assembly carries the inner transfer rods 478, 480 forward a corresponding distance of two feet. The outer transfer rods 477, 479 are simultaneously moved forwardly a distance of four feet when the carriage assembly is moved a distance of two feet due to the action of the gear members 505, mounted on each side of the axle rod 495, with the rack elements 506 fixed to the base plate and the rack sleeve 532 fixed to the outer transfer rods. Thus, the outer transfer rod moves twice the distance that the inner transfer rod moves during movement of the carriage assembly. In order to control movement of the palletized plating fixtures in a predetermined manner, the double acting cylinder 520 is connected to the actuating rods 555 which cause rotation of the transfer rods and thereby rotate the pallet engaging dogs between varying positions of engagement and disengagement with the palletized plating fixtures.

Referring now to FIGURE 19, the operating sequence of the double ended cylinder 520 and positioning of the pallet engaging dogs on the transfer rod is shown diagrammatically. As shown in the first schematic diagram which illustrates the normal central position of the connecting rods 522, 523 of the double ended cylinder 520, the pallet engaging dogs are positioned so that no contact is made with the pallets of the palletized plating fixtures. The first step of a transfer cycle comprises actuation of the double acting cylinder 520 to move the piston rods from the central position to one of two oppositely extended positions and cause contra-rotation of the inner transfer rods 478, 480 to engage the dogs 568, 571 of the inner transfer rods 478, 480 with the transfer blocks 272, 273 on the pallet. The outer transfer rods 477, 479 are simultaneously contra-rotated to a dog disengaged position. The next actuation of the double acting cylinder 520 returns the piston rods from the extended position to the central position, as shown in the third diagram, to place the dogs in disengaged position and to permit return movement of the carriage assembly after a transfer movement. The double acting cylinder may next be fully extended in the other direction to rotate both the inner and outer transfer rods into pallet engaging position. In this position, the pallet engaging dogs 569, 570 of the inner transfer rods 478, 480 and the pallet engaging dogs 572, 573 of the outer transfer rods 477, 479 are all placed in engaged position. Thus, in one of the extended positions, the dogs on the inner transfer rods are engaged with some of the palletized plating fixtures for two foot movement and in the other extended position, the dogs on both the inner and outer transfer rods are engaged with separate palletized plating fixtures to move some two feet and some four feet. It is to be understood that the transfer mechanism described may be used to actuate the palletized plating fixtures in several different sequences and to move certain of the palletized plating cells varying distances. For instance, it would be within the scope of this invention to add another transfer rod on each side of the transfer mechanism and to provide means similar to the actuating means disclosed to cause axial displacement of the additional transfer rod a greater or lesser distance than the axial displacement of the outer transfer rod. Variations in the rack and gear arrangement may be provided to obtain any length of axial displacement desired and any number of additional transfer rods may be parallelly supported with the inner transfer and outer transfer rods shown.

The special transfer sequence adapted for this invention is shown schematically in FIGURE 18. The pelletized plating cells are shown individually along the conveyor line and the numerals 1–32 represent the various work stations provided along the path of travel of the palletized plating cells within the plating machine. The palletized plating fixtures are shown in varying positions on four schematic drawings of the machine. The first schematic drawing shows the transfer mechanism in the retracted position and illustrates palletized plating cells at all of the stations except idle station 17 and exit station 32. As may be seen, stations 18 and 19 represent nickel plating stations. It has been found that certain steps in the plating process require a longer time interval than other plating steps, and consequently, the nickel plating stations 18 and 19 are spaced by idle stations 17 and 20 for a purpose to be hereinafter described with reference to the outer transfer bars and the inner transfer bars. If a standard stop interval of 30 seconds is provided at each station, the plating cells at each of the stations may have the particular process applied for a period of approximately 30 seconds. Of course, this time interval can be varied and could be varied from station to station. However, to maximize plating rate and utilize production line methods, it is desirable to have equal stop intervals at each of the stations. After the palletized plating cells, shown in the first diagrammatic sketch, have been in the indicated positions for the predetermined time, the transfer mechanism is actuated, as previously described, to advance some of the palletized plating fixtures by use of the inner transfer rods which move those palletized plating fixtures engaged by the dogs thereon. Such palletized plating fixtures are moved two feet and thus each of the engaged palletized plating cells advances one station to the positions shown in the second diagrammatic drawing. It is to be noted that no transfer dogs are provided on the inner transfer rods at stations 18, 19 or 20. When the palletized plating cells are moved in the second step by the inner transfer rods, the palletized plating cells labeled 118f and 118g at stations 18 and 19 are not moved; but remain at their stations and the idle station 17 accommodates movement of the palletized plating cells at stations 1–16. In this manner, the workpieces carried by palletized plating fixtures 118f and 118g remain at the nickel stations for two stop intervals and the progressive step by step movement of the other palletized plating fixtures from station to station is not interrupted. The next step in the cycle is diagrammatically shown in the third drawing. In the third step, the transfer bars are retracted as previously described to prepare for another cycle and a palletized plating fixture 118m is removed from exit station No. 32. The finished workpiece is removed and another workpiece is loaded on the palletized plating fixture 118m. At the same time that one palletized plating fixture is removed from exit station No. 32, another one is positioned at entrance station No. 1. The fourth diagrammatic sketch illustrates an actuation of the transfer mechanism to cause forward movement of both the outer transfer rods and the inner transfer rods as hereinabove described. The outer transfer rods are provided with engaged dogs at stations Nos. 16, 17, 18, 19 so that when the transfer rods are advanced, the palletized plating fixtures 118d, 118e, 118f, 118g, are moved from their positions at stations Nos. 16, 17, 18, 19 shown in the third schematic diagram, to the positions at stations Nos. 18, 19, 20, 21 shown in the fourth schematic diagram. Each of the palletized plating fixtures are thus moved a total of two work stations. Accordingly, the palletized plating fixtures 118f and 118g remain at stations Nos. 18 and 19 for a processing period twice the available processing period for the other palletized plating cells at the other stations. As the palletized plating fixtures 118d 118e, 118f, 118g, are moved from stations Nos. 16, 17, 18, 19, the inner transfer rods simultaneously move the other pelletized plating fixtures two feet. The cycle of operation is completed by return of the transfer mechanism to the retracted position. It will thus be apparent that the applicants have provided transfer mechanism which may be utilized to provide a varied plating cycle without reducing the plating rate. Additional idle stations may be utilized and the idle stations described for purposes of illustration may be placed at other positions in the plating cycle. The provision of additional transfer rods and idle stations in the manner disclosed will permit wide variations in the plating cycle depending on the particular type of workpiece being plated, and the particular plating solution being used, and other variables.

AUTOMATIC MACHINE OPERATION

In automatic continuous operation of the machine, the spray housings and anode housings at the individual stations are all located in the retracted up positions at the beginning of processing. Conventional manual controls are provided at each station to accommodate loading of the machine at the beginning of automatic continuous operation and unloading of the machine at the end of automatic continuous operation. Thus a palletized plating fixture is located at each station and the loading and unloading conveyor is also applied with palletized plating fixtures to maintain continuous operation.

A master control switch is turned to automatic continuous position and a cycle start button is pushed. Thereafter, the machine will continue to cycle, automatically load an unplated part and associated palletized plating fixture at station No. 1, and automatically unload a plated part and associated palletized plating fixture from station No. 32. The operation of the machine will be hereinafter described with reference only to the unplated part and associated palletized plating fixture located at station No. 1 at the beginning of the cycle. It is to be understood that the aforedescribed movements of the other palletized plating fixtures takes place simultaneously and that the aforedescribed processing also is simultaneously initiated and completed at the other stations.

At the beginning of the cycle, the transfer bars are properly positioned with the dogs in engagement with the appropriate palletized plating fixtures on the machine. Actuation of the cycle start button energizes a solenoid control valve means associated with carriage cylinder 476 to actuate the cylinder and move the carriage to the extended position. The palletized plating fixture at station No. 1 is thereby moved to station No. 2. The carriage actuates limit switch 517 and the palletized plating fixture actuates the "on station" monitor switch (not shown). The limit switch 517 causes energization of a solenoid control valve means associated with transfer rod cylinder 520 to actuate the cylinder and rotate the transfer bars to the control, dog disengaged, position. Rotational movement of the transfer bars actuates limit switches 561 and 563. The limit switch 561 causes de-energization of the solenoid control valve means associated with the transfer rod cylinder 520 to stop rotation of the transfer bars. The limit switch 563 causes actuation of the solenoid control valve means associated with the carriage cylinder 476 which actuates the cylinder to return the carriage to the retracted position. The carriage actuates limit switch 516 at the end of the return movement of the carriage. The limit switch 516 causes energization of the solenoid valve control means associated with transfer rod cylinder 520 and the cylinder is actuated to cause rotation of the transfer rods to dog engagement position whereat the palletized plating fixtures may be moved two feet.

The monitor switch at station No. 2 causes energization of a solenoid control valve means associated with housing cylinder 133 to cause actuation of the cylinder and extend the spray housing into engagement with the palletized plating fixture. Downward movement of the spray housing actuates limit switch 161 which controls an electric processing timer and a solenoid control valve means associated with the spray apparatus. The electric processing timer is energized and the valve means turns on the water spray. When the electric timer times out after the preselected processing interval, the solenoid control valve means associated with the spray apparatus is de-energized and the water spray stopped and the solenoid control valve means associated with the housing cylinder 133 is actuated to cause actuation of the cylinder and return the spray housing to the retracted position. Upward movement of the spray housing actuates limit switch 162 which signals that the next transfer can begin. A similar operational sequence takes place at all the non-electrical stations.

When the unplated part and palletized plating fixture are transferred from station No. 2 to station No. 3, a similar operational sequence takes place. However, the operational sequence differs in that the solenoid control means associated with the transfer rod cylinder 520 is energized at the end of the previous cycle in a manner to cause the cylinder to be actuated in the opposite direction whereby both the two feet dogs and the four feet dogs are located in pallet engaging position. The limit switches 560, 562, replace the limit switches 561, 563 in the operational sequence; but perform exactly the same function. An additional difference is that the limit switch 161 at station No. 3, which is actuated by downward movement of the anode housing thereat, controls an electric process timer, a solution applying pump and electrical energization of the part. When the limit switch is actuated, the timer and pump are started, and D.C. current is applied to the part. When the timer times out after the preselected processing interval, the pump is deactivated, the current is shut off, and the anode housing cylinder is actuated as hereinbefore described. A similar operational sequence takes place at all the electric stations.

The aforedescribed illustrative embodiment of apparatus utilizing the principles of the present invention is not intended to limit the scope of the invention. Accordingly, obvious changes in the details of construction or the arrangement of the component parts are intended to be included within the meaning of the appended claims. In particular, the concept of providing a plating cell, through which processing solution can be pumped at a plurality of processing stations, includes not only the illustrative palletized plating fixture and reciprocable housings at each station; but also, a combined housing and palletized plating fixture capable of being transferred to a processing station as a unit. Thus, the term "plating cell" is intended to include a complete plating cell unit embodying the principles of the present invention, except insofar as limited by the prior art.

The following information relating to plating bath compositions and conditions is submitted to facilitate practice of the invention.

The copper strike bath solution for station No. 9 can be one of the usual copper strike baths, such as one containing copper cyanide, sodium cyanide, sodium carbonate and sufficient sodium hydroxide to properly adjust the pH. The bath composition, by analysis, and deposition conditions are as follows:

| | |
|---|---|
| Copper | 2.1. |
| Free cyanide | 1.0. |
| pH | 12–12.6. |
| Temperature | 160° F. |
| Cathode current density | 300 a.s.f. |
| Velocity | 30 ft./sec. |

Of course, other known and accepted copper strike baths can be used under substantially the same conditions.

Station 10 can also involve an alkaline copper bath solution. One which has been used contains copper cyanide, sodium cyanide and sufficient sodium hydroxide to adjust to the proper pH. The bath composition, by analysis, and operating conditions are as follows:

| | |
|---|---|
| Copper | 9 oz./gal. |
| Free cyanide | 1 oz./gal. |
| pH | 13. |
| Temperature | 180° F. |
| Cathode current density | 600 a.s.f. |
| Velocity | 40 ft./sec. |

The anode can be steel, but virtually any insoluble anode can be used. If desired, a leveler, such as Elchem 1442 can also be included at a concentration of about 1%, by volume.

Bath compositions conventionally used for copper plating can generally be used. Plating temperatures may vary from 70° F. to 190° F. Current density can vary from as low as 200 amperes per square foot to 2000 amperes per square foot. Analogously, electrolyte velocity is extremely variable and may vary from five feet per second to 500 feet per second. Continuous uninterrupted direct plating or interrupted direct plating can be used. Periodically reversed plating can be used, alone or with current interruption.

The "double nickel" stations Nos. 19 and 20, of course, are stations, respectively, for depositing a semi-bright layer and a full-bright nickel layer. It is to be understood, of course, that if only a full-bright nickel layer is to be used, station No. 19 can be vacant or it can be used as a full-bright nickel station like station No. 20. One can in this latter way obtain thicker deposits per unit time of machine operation to thereby decrease processing time or merely get thicker deposits.

The following bath composition and conditions can be used at station No. 19 to deposit the semi-bright nickel coating:

| | |
|---|---|
| Nickel (from $NiSO_4 \cdot 6H_2O$) | 10 oz./gal. |
| Boric acid | 8 oz./gal. |
| Leveler (Coumarin) | 2–2½ lbs./100 gal. |
| pH | 3.5–4.5. |
| Temperature | 180° F. |
| Current density | 1200 a.s.f. |
| Velocity (flow started before potential applied) | 40 ft./sec. |
| Anode | Lead. |

It is to be noted that the above bath is chloride free.

One may desire to vary the nickel ion concentration from eight ounces to 15 ounces per gallon. Analogously, the boric acid concentration might be varied from six to eight ounces per gallon. While one might desire to employ a pH as low as 2½ for some applications, in other applications one might desire to use a pH as high as five. The current density can vary widely, e.g., 750–2500 amperes per square foot. However, when using higher current densities, higher electrolyte velocities should be employed. Although an electrolyte velocity of 40 feet per second is generally satisfactory for current densities up to 1200 amperes per square foot, higher electrolyte velocities should be used for substantially higher current density depositions. Conversely, when lower current density depositions are used, one can employ lesser electrolyte velocities, including velocities as low as 20 feet per second.

The above nickel plating bath is designated as a semi-bright nickel plating bath. However, under our high speed plating conditions, the deposit formed actually approximates a full-bright deposit. Hence, for many applications, the subsequent deposition of a conventional bright nickel layer may not even be necessary and, in such instance, can be omitted.

The full-bright nickel layer can be deposited from substantially the same bath solution and under substantially the same conditions as previously described for electrodepositing the semi-bright nickel layer. The former only differs from the latter in that in the full-bright bath brighteners are used in place of, or in addition to, the leveler of the semi-bright bath. The brighteners can be used in the normal and accepted concentrations for any nickel plating. However, in some instances, it may be found that somewhat higher or lower concentrations of brighteners are preferred. The above formulated nickel plating bath can be used with the addition of about ½% to 1½%, by volume, of the brightener P–1 and a small amount of the brightener P–224, as required.

Any of the known and accepted chromium plating baths can be used in our apparatus and process, such as the bath disclosed in United States Patent No. 2,640,022. Of particular concern at the present time is a bath solution which will provide a dense, finely cracked chromium coating. Such a coating can be achieved using the commercially available bath composition identified as CR–110. This bath composition is used in the concentration and at the temperature recommended for conventional plating. Lead anodes are used. The cathode current density can vary up to 1800 amperes per square foot and electrolyte velocities up to 50 feet per second. Lesser electrolyte velocities can be used when chromium plating in the lower current density ranges, e.g., for 750 a.s.f. a velocity of five to ten feet per second may be used.

The same chromium plating bath solution and process can be employed for both of stations Nos. 25 and 27. However, if desired, different bath solutions and/or plating conditions can be used to form different types of chromium deposits.

The invention has been described in connection with a certain complete plating sequence. However, it is to be understood that other plating sequences can be used. Similarly, the basic concepts of the invention can be used in a machine having only one high speed plating station, hence a machine for depositing only one metal.

The invention claimed is:

1. An apparatus for plating individual workpieces comprising, a plurality of work stations including at least one plating station, conveyor means for moving individual workpieces from station to station, a pallet adapted to be movably carried on said conveyor means, a cathode fixture secured to said pallet and movable therewith between said work stations, said cathode fixture comprising a base portion, said base portion having a contoured upper surface configured to match said workpiece, means to retain said workpiece on said contoured surface of said base portion, an inlet port extending through said base portion and opening adjacent one end of said contoured surface, an outlet port extending through said base portion and opening adjacent the other end of said contoured surface, transfer means for moving said pallet and said cathode fixture from work station to work station on said conveyor means, inlet and outlet conduit means provided at each electrolyte station, connecting means provided at each of electrolyte stations for connecting said inlet conduit to said inlet port in said base portion and for connecting said outlet conduit to said outlet port in said base portion, an anode fixture provided at plating stations, said anode fixture being reciprocably supported relative to said conveyor means, anode actuating means for causing movement of said anode fixture from a retracted position spaced above said conveyor to an extended position in engagement with said cathode fixture on said conveyor means, lead means connecting said anode to a power source, electrical connecting means being positioned for current transferring engagement with said cathode fixture at each of said work stations to cause energization of said workpiece, said anode fixture having a lower surface contoured to match the configuration of said workpiece, means to sealingly engage said anode fixture around the periphery of said workpiece to provide a passageway coextensive with the surface of said workpiece to be plated from said inlet passage to said outlet passage, and processing solution conveying means provided at each of said plating stations to cause a processing solution to pass through said passage and over said workpiece to perform a processing operation thereon.

2. A method of applying a plurality of processing solutions to a workpiece at a plurality of processing stations comprising the steps of mounting the workpiece in fixed relationship with a palletized processing fixture for movement of the workpiece in a fixed position on said palletized processing fixture between said processing stations, forming a processing cell by surroundingly engaging the pelletized processing fixture with an enclosing housing, positioning an anode in a predetermined spatial relationship with said workpiece within said processing cell to define processing solution applying passages between said anode and said workpiece, moving the palletized processing fixture from station to station for application of varying process solutions, stopping the palletized processing fixture at the process stations for predetermined time intervals, applying processing solution under pressure to the workpiece within the processing cell at the process stations during the predetermined time intervals, and simultaneously electrically energizing said anode and said workpiece at some of said stations to provide for electrolytic processing of said workpiece.

3. A method of electrolytic plating of a part of compound curvature comprising the steps of fastening the part on a palletized fixture, positioning a conforming anode closely adjacent a surface of the part to be plated, forming a flow passage between said conforming anode and said surface of the part by sealing engagement of the rim of the conforming anode with adjacent portions of the fixture, spacing said conforming anode a predetermined distance from said surface to be plated, applying plating solution under pressure through an inlet at one end of said flow passage and rapidly flowing plating solution over said surface to an outlet at the other end of said passage, and simultaneously electrically energizing said conforming anode and said part to electrolytically deposit a coating on said part.

4. A palletized processing cell for application of a plurality of processing solutions to a workpiece at a plurality of processing stations comprising, a pallet portion, conveyor engaging means provided on said pallet portion for transportation thereof between processing stations, a centrally located recess formed on the top surface of said pallet, an enclosing rim extending around said recess, an inlet port and an outlet port extending through said pallet within said recess, electrical connecting means centrally located in said recess and extending through said pallet, a cathode fixture secured to said pallet on said recess within said enclosing rim, said fixture comprising a central workpiece support member, an inlet port and an outlet port provided in said workpiece support member and being coaxially aligned with the inlet port and the outlet port in said pallet portion, an electrical connecting cavity centrally located in said casting and receiving said electrical connecting means extending through said pallet, a plastic shell formed on the top of said casting, said plastic shell having a contoured upper surface adapted to correspondingly match a support surface of said workpiece, a plurality of electrical contact cavities formed in the top surface of said plastic shell, connecting ports extending between said contact cavities and said electrical connecting cavity in said casting, a plurality of flexible electrical contacts mounted in said contact cavities and normally extending upwardly beyond the contoured upper surface for contacting engagement with the support surface of the workpiece, latch means provided on said cathode fixture to secure a workpiece in surface engagement with said contoured upper surface of said plastic shell and in electrical engagement with said flexible contacts, a substantially flat rim formed around said upper contoured surface, a sealing gasket mounted on said flat rim, an inlet orifice formed between said flat rim and said contoured upper surface adjacent one end thereof and being connected to said inlet passage in said workpiece support member, an outlet orifice formed between said flat rim and said contoured upper surface adjacent the opposite end thereof and being connected to said outlet passage in said workpiece support member, a protective coating of plastic formed integrally with said plastic shell and extending around the exterior surfaces of said casting and within said inlet port and said outlet port, an additional protective coating of plastic provided on the interior surfaces of said casting, an anode fixture, a lower surface of said anode fixture being contoured to match the upper surface of said workpiece, a rim surrounding said lower contoured surface of said anode fixture and adapted to engage the substantially flat rim surrounding the upper contoured surface of said plastic shell, said lower surface of said anode fixture being spaced from said upper surface of said workpiece to define a flow passage extending for said inlet orifice to said outlet orifice when said anode fixture is seated on the substantially flat rim on said plastic shell, a housing surrounding said anode fixture and being fixably secured thereto, an electrical source being connected to said anode fixture through said housing, and a lower rim provided on said housing for sealing engagement with said pallet when said anode fixture is seated on said plastic shell.

5. In a plating machine, conveyor means extending along a plurality of work stations which include at least one plating station having electrical connection means, a plating cell for supporting a workpiece during a processing operation thereon, a pallet, said plating cell being mounted on said pallet and movable therewith between said work stations, a conforming electrode in said cell defining an enclosed processing solution flow path over the surface of said workpiece, an inlet port and an outlet port in said cell communicating with said processing solution flow path for rapidly circulating processing solution over the surface of said workpiece, transfer mechanism for moving said pallet on said conveyor means between said work stations, and process solution supply means provided at each of said work stations for connection with said plating cell to perform a particular process step on the workpiece in the cell.

6. A plating machine comprising a plurality of work stations, conveyor means extending between said work stations, pallet means adapted to be carried on said conveyor means between said work stations, transfer mechanism for moving said pallet means on said conveyor means between said stations, a plating cell component for supporting a workpiece fixed to said pallet and being movable therewith between said work stations, at least one of said stations being a plating station having electrical connection means, a conforming anode in said cell at said plating station, said conforming anode defining an enclosed plating solution flow path over the surface of said workpiece, an inlet port in said cell component communicating with one end of said solution flow path, an outlet port in said cell component communicating with the other end of said solution flow path, process solution containing means provided at each non-rinse processing station, conduit means for supplying said process solution from said containing means to said plating cell component at each of said stations, pump means to cause movement of said process solution from said process solution containing means to said plating cell at each of said non-rinse processing stations, and conduit means for removing said process solution from said plating cell component at each non-rinse processing station prior to movement of said palletized plating cell therefrom to a subsequent work station.

7. In a machine for applying various processing solutions to a workpiece, a continuous in-line conveyor, a plurality of processing stations spaced along said conveyor to apply the various processing solutions to the workpiece, transfer means to convey the workpiece between stations after a predetermined stop interval, a processing cell formed at each processing station during the stop interval, means for fixedly securing a workpiece to a palletized portion of said processing cell, at least one of said processing stations being an electrolytic station having electrical connection means for performing an electrolytic surface treatment on said workpiece, a counterelectrode at the electrolytic station having a surface contoured to match said workpiece and being spaced from and sealingly surrounding said workpiece in said cell to define an enclosed flow passage therebetween, flow passage inlet and outlet ports in said cell, processing solution supply means being connectible with said inlet port flow passage at said electrolytic station, means to supply processing solution under pressure through said flow passage during the stop interval at said station, and electrical means to energize said counter-electrode and said workpiece.

8. A method of electroplating a workpiece comprising the steps of:
   (1) mounting the workpiece on a palletized plating fixture,
   (2) moving the palletized plating fixture on a continuous conveyor extending between adjacent processing stations, at least one of said stations being an electrolytic processing station,
   (3) stopping the palletized plating fixture on said continuous conveyor at successive processing stations,
   (4) associating cover means with said palletized plating fixture to form processing cells at said successive processing stations,
   (5) at plating stations providing a conforming anode in said housing and closely spacing it adjacent said workpiece to define an enclosed plating solution flow path along the surface of said workpiece,
   (6) pumping plating solution at a rapid rate over said workpiece through a fixture inlet at one end of said flow path along said flow path to a fixture outlet at the other end of said flow path for a predetermined period,
   (7) applying a negative potential to said workpiece and a positive potential to said anode while passing the plating solution through the cell,
   (8) discontinuing the pumping of said plating solution and terminating application of said potentials after said predetermined period,
   (9) removing the cover means, and
   (10) transferring the palletized plating fixture to the next processing station.

9. A method of electroplating a workpiece comprising the steps of:
   (1) mounting the workpiece on a palletized plating fixture,
   (2) moving the palletized plating fixture from station to station in a horizontal path on a continuous conveyor extending between adjacent processing stations, at least one of said stations being an electroplating station,
   (3) stopping the palletized plating fixture at each station for process application thereto,
   (4) associating cover means with said palletized processing fixture to form a processing cell at each processing station,
   (5) at plating stations providing a conforming anode in said housing and closely spacing it adjacent said workpiece at plating stations to define an enclosed plating solution flow path along the surface of said workpiece,
   (6) providing a non-processing position between processing stations,
   (7) providing double plating stations immediately after the first non-processing position,
   (8) providing a second non-processing position after the second of the double plating stations,
   (9) moving the palletized plating fixture on the continuous conveyor so that the palletized plating fixture is stopped at one of the non-processing positions for the standard stop interval and is stopped at one of the double plating stations for a period of time equal to twice the stop interval,
   (10) at both of said plating stations pumping plating solution at a rapid rate over said workpiece through a fixture inlet at one end of said flow path along said flow path to a fixture outlet at the other end of said flow path for a period up to double the other processing station stop periods,
   (11) applying a negative potential to said workpiece and a positive potential to said anode while passing the plating solution through the cell,
   (12) discontinuing the pumping of said plating solution and terminating application of said potentials,
   (13) removing the cover means, and
   (14) transferring the palletized plating fixture from the double plating station for post plating treatments.

10. In plating apparatus comprising a plurality of processing stations including at least one plating station having electrical connection means and conveyor means associated therewith, a palletized plating fixture, means to secure a workpiece to be processed on said palletized plating fixture, means to move said palletized plating fixture on said conveyor means to said plating station, housing means reciprocably mounted above said conveyor means at said plating station, means to raise said housing means to a retracted position above said conveyor means and said palletized plating fixture and then to lower it to an extended position in engagement with said palletized plating fixture, conforming anode means associated with said housing means and forming an electrolytic plating cell with said palletized plating fixture in said housing's extended position, said conforming anode defining an enclosed plating solution flow path over the surface of said workpiece, a processing solution inlet and outlet in said fixture communicating with said flow path, means to apply a negative potential to said workpiece and a positive potential to said anode after formation of said plating cell, and means to pump plating solution into said fixture inlet through said plating cell along said flow path and out said fixture outlet.

11. A method of applying various processing solutions in the electrolytic surface treatment of a workpiece comprising the steps of mounting a workpiece on a palletized processing fixture for movement between a plurality of processing stations, at least one of said processing stations being an electrolytic processing station having electrical connection means, progressively moving said palletized fixture from station to station after predetermined stop intervals at said stations on a continuous conveyor mechanism, forming a processing cell with said palletized fixture for treating said workpiece at said stations, at said electrolytic station spacing a conforming counter-electrode in said cell closely adjacent said workpiece to define an enclosed processing solution flow path therebetween, applying processing solution under pressure to said workpiece in said cell at said processing stations during said stop intervals without removing said workpiece from said palletized processing fixture, at said electrolytic station applying said processing solution under pressure to said flow path through an inlet port in said fixture and removing said solution from an outlet port after passing along the solution flow path between the workpiece and its counter-electrode.

References Cited by the Examiner

UNITED STATES PATENTS

| | | | |
|---|---|---|---|
| 2,519,945 | 8/1950 | Twele et al. | 204—15 X |
| 2,851,044 | 9/1958 | Davis | 134—76 |
| 2,929,487 | 3/1960 | Lisowski et al. | 204—198 |
| 3,024,794 | 3/1962 | Chill | 204—198 |

FOREIGN PATENTS 455,810  10/1936  Great Britain.

JOHN H. MACK, *Primary Examiner.*

H. S. WILLIAMS, W. VAN SISE, *Assistant Examiners.*

UNITED STATES PATENT OFFICE
CERTIFICATE OF CORRECTION

Patent No. 3,276,978            October 4, 1966

Robert A. Spaulding et al.

It is hereby certified that error appears in the above numbered patent requiring correction and that the said Letters Patent should read as corrected below.

Column 6, line 47, for "in" read -- is --; column 9, line 55, for "Station 11 and 12" read -- Stations 11 and 12 --; column 11, line 36, for "4 and of" read -- 4 and 5 of --; column 13, line 4, for "housing" read -- housings --; column 17, line 62, for "commercially plastisols" read -- commercially available plastisols --; column 18, line 13, for "shaft" read -- shafts --; column 21, line 33, for "while" read -- which --; line 38, for "nicket" read -- nickel --; column 23, lines 68 and 69, for "transger" read -- transfer --; column 24, line 44, for "switches 560, 652," read -- switches 560, 561, 562 --; column 25, line 75, column 26, line 71, and column 31, line 1, for "pelletized", each occurrence, read -- palletized --; column 30, lines 45 and 46, for "electrolyte" each occurrence, read -- electrolytic --.

Signed and sealed this 5th day of September 1967.

(SEAL)
Attest:

ERNEST W. SWIDER
Attesting Officer

EDWARD J. BRENNER
Commissioner of Patents